US012662312B2

(12) United States Patent
Heggebø

(10) Patent No.: US 12,662,312 B2
(45) Date of Patent: Jun. 23, 2026

(54) VEHICLE FOR TRANSPORTING STORAGE CONTAINERS IN AN AUTOMATED STORAGE AND RETRIEVAL SYSTEM

(71) Applicant: Autostore Technology AS, Nedre Vats (NO)

(72) Inventor: Jørgen Djuve Heggebø, Olen (NO)

(73) Assignee: AutoStore Technology AS, Nedre Vats (NO)

( * ) Notice: Subject to any disclaimer, the term of this patent is extended or adjusted under 35 U.S.C. 154(b) by 418 days.

(21) Appl. No.: 18/037,691

(22) PCT Filed: Oct. 28, 2021

(86) PCT No.: PCT/EP2021/079988
§ 371 (c)(1),
(2) Date: May 18, 2023

(87) PCT Pub. No.: WO2022/111939
PCT Pub. Date: Jun. 2, 2022

(65) Prior Publication Data
US 2023/0406628 A1 Dec. 21, 2023

(30) Foreign Application Priority Data
Nov. 30, 2020 (NO) ................................... 20201317

(51) Int. Cl.
*B65G 1/04* (2006.01)
*B65G 1/137* (2006.01)
(52) U.S. Cl.
CPC ......... *B65G 1/0492* (2013.01); *B65G 1/1375* (2013.01)

(58) Field of Classification Search
CPC ................ B65G 1/0492; B65G 1/1375; B65G 2201/0235; B65G 2203/0266;
(Continued)

(56) References Cited

U.S. PATENT DOCUMENTS

| | | |
|---|---|---|
| 10,000,337 B2 | 6/2018 | Lindbo et al. |
| 2003/0077159 A1 | 4/2003 | Iizuka |

(Continued)

FOREIGN PATENT DOCUMENTS

| | | |
|---|---|---|
| CN | 111422547 A | 7/2020 |
| CN | 212474844 U | 2/2021 |

(Continued)

OTHER PUBLICATIONS

International Search Report issued in PCT/EP2021/079988 on Feb. 23, 2022 (4 pages).

(Continued)

*Primary Examiner* — Justin Holmes
(74) *Attorney, Agent, or Firm* — Baker Botts L.L.P.

(57) ABSTRACT

A remotely operated vehicle for transporting a storage container on a rail system of an automated storage and retrieval system. The vehicle includes a first set of drivers for moving the vehicle along a first direction on the rail system and a second set of drivers for moving the vehicle along a second direction on the rail system, the second direction being perpendicular to the first direction. The vehicle further includes a storage container support for carrying the storage container, which is moveably between a first position and a second position. The storage container support is configured to support the storage container from below.

25 Claims, 27 Drawing Sheets

(58) Field of Classification Search

CPC .... B65G 1/0478; B65G 1/0464; B65G 1/065;
B65G 1/1378; B65G 61/00

See application file for complete search history.

(56) References Cited

U.S. PATENT DOCUMENTS

| | | | | |
|---|---|---|---|---|
| 2015/0225187 | A1* | 8/2015 | Razumov | B65G 1/0492 |
| | | | | 414/807 |
| 2015/0291357 | A1 | 10/2015 | Razumov | |
| 2017/0260011 | A1 | 9/2017 | Schoeppe et al. | |
| 2018/0305124 | A1 | 10/2018 | Guo et al. | |
| 2020/0216298 | A1* | 7/2020 | Gravelle | B66F 9/122 |
| 2021/0179355 | A1 | 6/2021 | Heggebo et al. | |
| 2021/0229916 | A1 | 7/2021 | Austrheim | |

FOREIGN PATENT DOCUMENTS

| | | | | |
|---|---|---|---|---|
| CN | 113213045 | A | 8/2021 | |
| EP | 3040237 | A1 | 7/2016 | |
| EP | 3929107 | A1 | 12/2021 | |
| KR | 20180121582 | A | 11/2018 | |
| NO | 121829 | B | 4/1971 | |
| NO | 317366 | B1 | 10/2004 | |
| NO | 20171741 | A1 | 5/2019 | |
| WO | 2011/113053 | A1 | 9/2011 | |
| WO | 2013/167907 | A1 | 11/2013 | |
| WO | 2014/075937 | A1 | 5/2014 | |
| WO | WO-2014090684 | A1 * | 6/2014 | B66F 9/06 |
| WO | 2015/140216 | A1 | 9/2015 | |
| WO | 2015/193278 | A1 | 12/2015 | |
| WO | 2016/172793 | A1 | 11/2016 | |
| WO | 2017/081281 | A1 | 5/2017 | |
| WO | 2018/146304 | A1 | 8/2018 | |
| WO | 2019/076760 | A1 | 4/2019 | |
| WO | 2019/101725 | A1 | 5/2019 | |
| WO | 2019/172824 | A1 | 9/2019 | |
| WO | 2019/206440 | A1 | 10/2019 | |
| WO | 2019/206487 | A1 | 10/2019 | |
| WO | 2019/238703 | A1 | 12/2019 | |
| WO | 2019232652 | A1 | 12/2019 | |
| WO | 2020/094336 | A1 | 5/2020 | |
| WO | 2020/094337 | A1 | 5/2020 | |
| WO | 2020/094339 | A1 | 5/2020 | |
| WO | 2021/239515 | A1 | 12/2021 | |
| WO | 2022/008670 | A1 | 1/2022 | |

OTHER PUBLICATIONS

Written Opinion of the International Searching Authority issued in PCT/EP2021/079988 on Feb. 23, 2022 (10 pages).

International Preliminary Report on Patentability from PCT/EP2021/079988 on Mar. 7, 2023 (18 pages).

Written Opinion of the International Preliminary Examining Authority issued in PCT/EP2021/079988 Oct. 26, 2022 (6 pages).

Norwegian Search Report issued in NO 20201317 mailed on Jun. 17, 2021 (3 pages).

International Search Report issued in PCT/EP2021/082486 on Feb. 16, 2022 (5 pages).

Written Opinion of the International Searching Authority issued in PCT/EP2021/082486 on Feb. 16, 2022 (10 pages).

International Preliminary Report on Patentability from PCT/EP2021/082486 on Feb. 22, 2023 (17 pages).

Written Opinion of the International Preliminary Examining Authority issued in PCT/EP2021/082486 Oct. 28, 2022 (6 pages).

Norwegian Search Report issued in NO 20200871 mailed on Nov. 9, 2021 (2 pages).

Norwegian Search Report issued in NO 20201315 mailed on Sep. 22, 2021 (2 pages).

Martin, Benoit, Extended European Search Report in EP24220375.0, mailed Jun. 6, 2025, 10 pages, European Patent Office, Munich, Germany.

Yu, Jin, Office Action in CN202180078500.5, mailed Jun. 26, 2025, 19 pages, The State Intellectual Property Office of the People's Republic of China, Beijing, China.

Otsuka, Takako, Office Action in JP2023532338, mailed Dec. 2, 2025, 9 pages, Japan Patent Office, Tokyo, Japan.

Otsuka, Takako, Office Action in JP2023532338, mailed Mar. 3, 2026, 5 pages, Japan Patent Office, Tokyo, Japan.

* cited by examiner

500

500

VEHICLE FOR TRANSPORTING STORAGE CONTAINERS IN AN AUTOMATED STORAGE AND RETRIEVAL SYSTEM

FIELD OF THE INVENTION

The present invention relates to an automated storage and retrieval system for storage and retrieval of containers, in particular to a remotely operated vehicle for transporting storage containers in such system.

BACKGROUND AND PRIOR ART

FIG. 1A discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108, which may be a rail grid, arranged across the top of framework structure 100, on which rail system 108 a plurality of container handling vehicles 201,301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings/grid openings 115 in the rail system 108. The container handling vehicles 201,301 can move laterally above the storage columns 105, i.e. in a plane which is parallel to the horizontal X-Y plane.

The horizontal extent of one of the grid cells 122 constituting the grid pattern is in FIG. 1A marked by thick lines.

The rail system 108 may be a single rail system, as is shown in FIG. 1B. Alternatively, the rail system 108 may be a double rail system, as is shown in FIG. 1C, thus allowing a container handling vehicle 201 having a footprint generally corresponding to the lateral area defined by a grid cell 122 to travel along a row of grid columns 105 even if another container handling vehicle 201 is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 has a grid opening 115 which is delimited by a pair of rails 110a,110b of the first set of rails 110 and a pair of rails 111a,111b of the second set of rails 111. The horizontal extent of each grid cell 122 comprises the grid opening 115 and the pair of rails 110a,110b of the first set of rails 110 and a pair of rails 111a,111b of the second set of rails 111 delimiting the grid opening 115. In FIGS. 1C and 1D the grid cell 122 is indicated by a dashed box.

Consequently, rails 110a and 110b form pairs of rails defining parallel rows of grid cells running in the first direction X, and rails 111a and 111b form pairs of rails defining parallel rows of grid cells running in the second direction Y.

As shown in FIG. 1D, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122 due to the horizontal extent of the rails.

In the first direction X and second direction Y, neighboring grid cells are arranged in contact with each other such that there is no space therebetween.

The upright members 102 of the framework structure 100 may be used to guide the storage containers 106 during raising of the containers 106 out from and lowering of the containers 106 into the storage columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the first direction X and in the second direction Y, respectively. In FIGS. 2 and 3 two wheels in each set are fully visible. The first set of wheels 201b,301b is arranged to engage with two adjacent rails of the first set of rails 110, and the second set of wheels 201c,301c is arranged to engage with two adjacent rails of the second set of rails 111. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 201a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane PH. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in the first direction X and second direction Y, while each storage cell may be identified by a position/container number in the first direction X, second direction Y and third direction Z.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the first direction X and the second direction Y which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018/146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1A, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1A, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a target storage container 106' stored in one of the columns 105 disclosed in FIG. 1A is to be accessed, one of the container handling vehicles 201,301 is instructed to retrieve the target storage container 106' from its position and transport it to the drop-off port column 119. This operation involves moving the container handling vehicle 201,301 to a location above the storage column 105 in which the target storage container 106' is positioned, retrieving the target storage container 106' from the storage column 105 using the container handling vehicle's 201,301 lifting device (not shown), and transporting the target storage container 106' to the drop-off port column 119. If the target storage container 106' is located deep within a stack 107, i.e. with one or a plurality of other storage containers 106 positioned above the target storage container 106', the operation also involves temporarily moving the above-positioned storage containers 106 prior to lifting the target storage container 106' from the storage column 105. This step, which is sometimes referred to as "digging" within the art, may be performed with the same container handling vehicle 201,301 that is subsequently used for transporting the target storage container 106' to the drop-off port column 119, or with one or a plurality of other cooperating container handling vehicles 201,301. Alternatively, or in addition, the automated storage and retrieval system 1 may have container handling vehicles 201,301 specifically dedicated to the task of temporarily removing storage containers 106 from a storage column 105. Once the target storage container 106' has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301 positions the storage container 106 at the desired position. The removed storage containers 106 may then be lowered back into the storage column 105 or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 900 which typically is computerized and which typically comprises a database for keeping track of the storage containers 106.

At a port area, i.e. an area at the upper rail system 108 adjacent or near the port column 119,120, a plurality of container handling vehicles 201,301 may sometimes have to line up waiting to drop off or pick up a storage container 106. Such queueing should be avoided as it causes unnecessary intermission to the operation of the container handling vehicles 201,301 and hence unnecessary halt to the system 1.

Further, in known storage systems the container handling vehicles 201,301 deliver or pick up the storage containers 106 to or from the port column 119,120 themselves and hence in large storage systems 1 the container handling vehicles 201,301 may have to travel long distances to deliver or pick up the storage container 106 at the port column 119,120 which may be time consuming and inefficient.

A first object of the present invention to provide a storage and retrieval system that mitigates these disadvantages.

A second object of the present invention to provide a remotely operated vehicle that can assist in transferring storage containers within a storage and retrieval system while not occupying unnecessary space on the grid system of the storage and retrieval system.

A third object of the present invention is to provide a remotely operated vehicle being a movable temporary storage vehicle that can carry multiple storage containers simultaneously when needed.

A fourth object of the present invention is to provide a remotely operated vehicle for reducing queuing or congestion.

SUMMARY OF THE INVENTION

The present invention is set forth and characterized in the independent claims, while the dependent claims describe other characteristics of the invention.

In a first aspect, the invention is related to a remotely operated vehicle for transporting a storage container on a rail system of an automated storage and retrieval system.

The vehicle may comprise a vehicle body having a base comprising a first set of driving means arranged on opposite sides of the vehicle body for moving the vehicle along a first horizontal direction X on a rail system as disclosed in the background an prior art section above.

Further, the vehicle may comprise a second set of driving means arranged on the other opposite sides of the vehicle body or within a cavity of the vehicle body, for moving the vehicle along a second horizontal direction Y on the rail system. The second direction Y is perpendicular to the first direction.

The base is preferably a wheeled base comprising a first set of wheels and a second set of wheels for guiding the container handling vehicle along the rail system in the first direction X and second direction Y, respectively. Further, one of the sets of wheels can be connected to a wheel displacement assembly being able to lift and lower the connected set of wheels relative to the other set of wheels such that only the set of wheels travelling in a desired direction is in contact with the rail system. The wheel displacement assembly can be driven by an electric motor. Further, both of the sets of wheels can be individually connected at least to two electric motors powered by a power source such as a rechargeable battery for moving the wheeled base unit in the desired direction.

Alternatively, the base can be a belt base comprising a first belt and a second belt for guiding the container handling vehicle along the rail system in the first direction X and second direction Y respectively.

Further, the vehicle comprises at least one storage container support for carrying/supporting the storage container. The storage container support is moveably mounted to the vehicle body such that the storage container support is movable between a first position and a second position. In the second position the storage container support is extending in a horizontal plane for supporting the storage container. Hence the storage container is arranged on top of the storage container support when supported thereon. In other words, the storage container is supported from below when arranged on the storage container support.

The vehicle has a first footprint A when the storage container support is in the first position and a second footprint B when the storage container support is in the second position. The second footprint B is larger than the first footprint A in at least one of the first and/or second directions X,Y.

When the storage container support is arranged in the first position it may be seen as being stowed, while it is deployed in the second position.

The term "footprint" should be understood as a vertical/downward projection. Hence the footprint extends in the horizontal plane along the first and second directions X,Y.

Preferably, the first footprint A is at least the size/horizontal extent of one grid cell of a rail system as defined in the background and prior art section e.g. the size of the grid opening plus the size of the pair of rails of the first set of rails and the pair of rails of the second set of rails delimiting the grid opening. The first footprint A may for example be equal to a vertical projection of the vehicle body. Further, the vertical projection of the vehicle body may be equal to the vertical projection of the base of the vehicle which again may be the size of one grid cell of the rail system.

The second footprint B is preferably between 20% and 300% larger than footprint A, more preferably between 50% and 200% larger than the first footprint A.

The at least one moveably mounted storage container support may be pivotally mounted to the vehicle body at a pivot point such that the storage container support is movable in a pivoting motion about the pivot point between the first and second positions. Hence, when the storage container support is arranged in the first position the storage container support may mainly be vertically arranged i.e. comprising mainly a component in a third vertical direction Z.

The storage container support may be pivotally mounted to a side wall of the vehicle body at a pivot connection.

Alternatively or additionally, the storage container support may comprise two parts/sections wherein a first part is pivotally arranged such that only the first part of the storage container support is moveable in a pivoting motion. The first part may be pivotally mounted to the base of the vehicle while a second part of the storage container support can be fixedly arranged to the vehicle body for example above a part of the base.

The movement of the pivotally mounted storage container support can be actuated by for example an electric actuator driven by battery driven motor.

The vehicle may comprise more than one pivotally arranged storage container support. Two storage container supports may for example be mounted on opposite sides of the vehicle body, or mounted such that they project beyond the footprint of the vehicle body in opposite directions along the first and/or second direction X,Y.

Instead of or in addition to being pivotally mounted, at least one storage container support can be slidably mounted to the vehicle body such that the storage container support is slidable in one of the first or second horizontal directions X,Y between the first and second positions. In other words the storage container support can be seen as being configured for linear translational movement in the horizontal direction, preferably linear translational movement in one of the first or second directions X, Y.

The storage container support may be slidably mounted to the top/upper surface of the base of the vehicle by an electrically driven linear actuator connected to both the storage container support and the base.

In another embodiment, the vehicle may comprise at least one telescopically mounted storage container support being mounted to the vehicle body. Hence, the storage container support can be telescopically extending in one of the first or second horizontal directions X, Y when moving between the first and second positions of the storage container support.

The storage container support may be mounted to the upper surface of the base of the vehicle.

In a further embodiment, the storage container support can be rotationally mounted to the vehicle body such that the storage container support is rotating in the horizontal plane between the first and second positions of the storage container support.

The storage container support may be mounted to one of the sides of the vehicle body or on top of the base of the vehicle body and be actuated by an electric actuator.

Generally, when the at least one storage container support is arranged in the first position, the footprint of the storage container support can be within the footprint of the vehicle body and hence the first footprint A of the vehicle can be equal to the footprint of the vehicle body. However, when the storage container support is arranged in the second position, the storage container support may be mainly horizontally arranged and further arranged such that the storage container support projects beyond the footprint of the vehicle body. Hence, the second footprint B will be larger than the first footprint A.

In the second position the storage container support may be in the position for receiving a storage container from a delivery device. A configuration of the storage container support in the second position projecting in the first or second horizontal direction X,Y from the vehicle body may simplify the loading/offloading of the storage container to/from the storage container support as the position of storage container support can be adjusted due to the movable movement of the storage container support.

As mentioned, the movement of the at least one storage container support can be facilitated/actuated by an electrically operated actuator arranged within the vehicle body such as the base thereof. The actuator can be an electrically driven linear actuator. Alternatively, the actuator can be a pneumatic or hydraulic actuator operated by an electric signal.

The storage container support provides a supportive function to the storage container at least when arranged in the second position and may hence have many different shapes. The storage container support may be in a form of a shelf being flat/planar such as having a supportive plate like structure of different shapes or it may comprise multiple arms etc. supporting the storage container from below. Further, to provide the supportive function it can comprise any type of scissor, folding, pivoting, rotating or sliding type of mechanism to achieve that supportive function at the second position.

The storage container support may be up to 20% larger than a base area of the storage container. The base area of the storage container should be understood as being the same as the vertical projection/footprint of the storage container.

The storage container support may extend in the first horizontal direction and a width of the storage container support in the second horizontal direction may then be equal to or within the footprint of the base when the storage container support is arranged in the first position.

The base of the vehicle body comprises a stabilizing structure extending directly below the storage container support when the storage container support is arranged in the second position for stabilizing the vehicle especially during driving.

The storage container support may extend in the first horizontal direction X and the stabilizing structure may extend in the same direction X from 20 to 90% of a total length of the storage container support. Preferably the stabilizing structure extends from 30 to 60% of the total length of the storage container support.

Instead of or in addition to the structures, the storage container supports may be provided with support wheels which may pivot from or be provided on the storage container support. The support wheels may extend in the third vertical direction Z from below the storage container support for interacting with the rail system when the storage container support is arranged in the second position.

In the above-mentioned embodiment where at least one storage container support could be rotationally mounted to the vehicle body, the vehicle could comprise a rotational carousel device having a vertical rotational axis. The storage container support may then be connected to the rotational carousel device allowing rotation of the storage container support from the first position to the second position.

The rotational carousel device could further comprise a carousel arm extending radially from a central portion of the rotational carousel device. The storage container support may be arranged at an end of the carousel arm distal to the vertical rotational axis. Further, a carousel motor configured to rotate the carousel arm around the vertical rotational axis can be connected thereto.

Further, a plurality of storage container supports may be connected to the rotational carousel device.

The vehicle may be configured to carry more storage containers when the storage container support is arranged in the second position than when the storage container support is arranged in the first position.

In a second aspect, the invention is related to an automated storage and retrieval system comprising a rail system having a first set of parallel rails arranged in a horizontal plane and extending in a first direction and a second set of parallel rails arranged in the horizontal plane and extending in a second direction which is orthogonal to the first direction which first and second sets of rails form a grid pattern in the horizontal plane. Hence, the rail system comprises a plurality of adjacent grid cells, wherein each grid cell comprises a grid opening, a portion of a pair of neighboring rails of the first set of rails and a portions of a pair of neighboring rails of the second set of rails, wherein said portions are delimiting the grid opening.

Below the rail system a plurality of stacks of storage containers are arranged in storage columns. Each storage column is located vertically below a grid opening.

Further, the system comprises a remotely operated vehicle as disclosed above for supporting at least one storage container. The vehicle is configured to move on the rail system above the storage columns.

Further, the system may comprise a delivery device for delivering storage containers to the storage container support of the remotely operated vehicle.

The vehicle body of the vehicle of the system may further comprise a vertically extending structure which is extending from the base. The vertically extending structure may comprise a cantilever at its upper end having a lifting device for raising and lowering a storage container to and from a position below the cantilever. The cantilever may hence extend in the first horizontal direction in the opposite direction to the storage container support when arranged in the second position. Further, the cantilever may be arranged at an opposite side of the vehicle compared to a position of the storage container support.

The storage container support is not the same as the lifting device raising and lowering the storage containers into and out of the storage columns.

Alternatively, the vehicle body may comprise a central cavity within the vehicle body having a lifting device for raising and lowering a storage container to and from a position within the cavity. The first set of wheels may have four wheels mounted in parallel with the outer walls of the vehicle body and the second set of wheels may have four wheels mounted on the inside of the cavity parallel to the inner walls of the vehicle body. The first and second sets of wheels are oriented perpendicular to each other.

The vehicle of the system may comprise sensors that detect the presence of a storage container on the at least one storage container support. Hence, if no storage container is present, the vehicle can automatically arrange the storage container support in the first positions assuring that the footprint of the vehicle is as small as possible.

Further, the vehicle may comprise sensors sensing the footprint of the vehicle in situ for calculating the fastest route on the rail system from one position to the other taking the footprint into account.

The system may comprise further have a control system for receiving information with regard to the footprint of the remotely operated vehicle for use in controlling the vehicle on the rail system of the automated storage and retrieval system.

The size of the first footprint A of the vehicle may be equal to the size of the grid cell of the system. Alternatively, the ratio between the size the grid cell and the size of first footprint A of the remotely operated vehicle can be from 1:1 to 1:2.

The remotely operated vehicle may further comprise a weight distribution system comprising a movable load and a load moving device for changing a center of gravity of the vehicle dependent on the load of one or more storage containers carried by the remotely operated vehicle. The load moving device can be an actuator such as a ball screw, rack pinion etc. The movable load can in one embodiment be the storage container and the load moving device can be the storage container supports(s) that the storage container(s) is/are arranged on. In another aspect the movable load can be a weight arranged within the wheeled base.

The weight distribution system may comprise:

sensor(s) for measuring weight of any storage container(s) supported by the storage container supports(s), and a control system connected to the sensor(s) and the load moving device, wherein the control system, based on the measured data from the sensor(s), senses a change in mass of at least two opposite sides of the vehicle and calculates a travel distance for the movable load corresponding to the change in mass, and instructs the load moving device to move the movable load the calculated travel distance in an opposite direction of the relatively heavier side of the vehicle.

The control system may perform live, i.e. real-time, calculations of the dynamic centre of gravity of the vehicle during movement, such as acceleration and deceleration, and instruct the load moving device to move the movable load in a direction such that the centre of gravity is forced to a more advantageous point with reduced risk of e.g. tilting of the vehicle.

The term "delivery device" should be understood as any device able to deliver/load or pick up/offload a storage container to or from the storage container supports(s) of the inventive vehicle. The delivery device may for example be any one of a human operator, a container handling vehicle, an automated guided vehicle (AGV), a truck, a gripper, a robot arm, an elevator, a port or a conveyor belt.

The relative terms "upper", "lower", "below", "above", "higher" etc. shall be understood in their normal sense and as seen in a cartesian coordinate system. When mentioned in relation to a well, "upper" or "above" shall be understood as a position closer to the surface of the well (relative to another component), contrary to the terms "lower" or "below" which shall be understood as a position further away from the surface of the well (relative another component).

In a third aspect, the invention is related to a method for operating a remotely operated vehicle.

The method may comprise the steps of:

moving the remotely operated vehicle towards a first location for receiving a storage container while at least one storage container support is in the first position, arranging the remotely operated vehicle at said first location and moving the at least one storage container support into the second position for receiving and storing the storage container.

Further, the method may comprise the step of moving the vehicle to a second location for delivering the storage container to a receiving unit while the storage container support is arranged in the second position.

The above-mentioned method steps can be monitored and controlled by the control system receiving and sending wireless data communication to the remotely operated vehicle.

The control system may hence initiate and control the movement of the storage container support between the first and second positions. Further, the control system may initiate and control the movement of the remotely operated vehicle on the rail system.

The use of such a remotely operated vehicle in an automated storage and retrieval system may provide a solution for reducing queuing or congestion by carrying storage containers from a point of digging to a port or in the proximity of the port. Further, the remotely operated vehicle can also move out of the way and cause minimal obstruction when it is not needed.

Summarized, the invention provides a remotely operated vehicle that can change footprint depending on the load of storage containers. Further, the vehicle can arrange a storage container support in a position for receiving a storage container from a delivering device.

BRIEF DESCRIPTION OF THE DRAWINGS

Following drawings are appended to facilitate the understanding of the invention. The drawings show embodiments of the invention, which will now be described by way of example only, where:

FIGS. 22A and 22G being perspective views of the vehicle, FIGS. 22B, 22C, 22D and 22F being side views of the vehicle and FIG. 22E being a detailed view of the connection of one of the rotationally mounted storage container supports shown in the dashed circle in FIG. 22D;

In the drawings, like reference numerals have been used to indicate like parts, elements or features unless otherwise explicitly stated or implicitly understood from the context.

DETAILED DESCRIPTION OF THE INVENTION

Figure 1A:
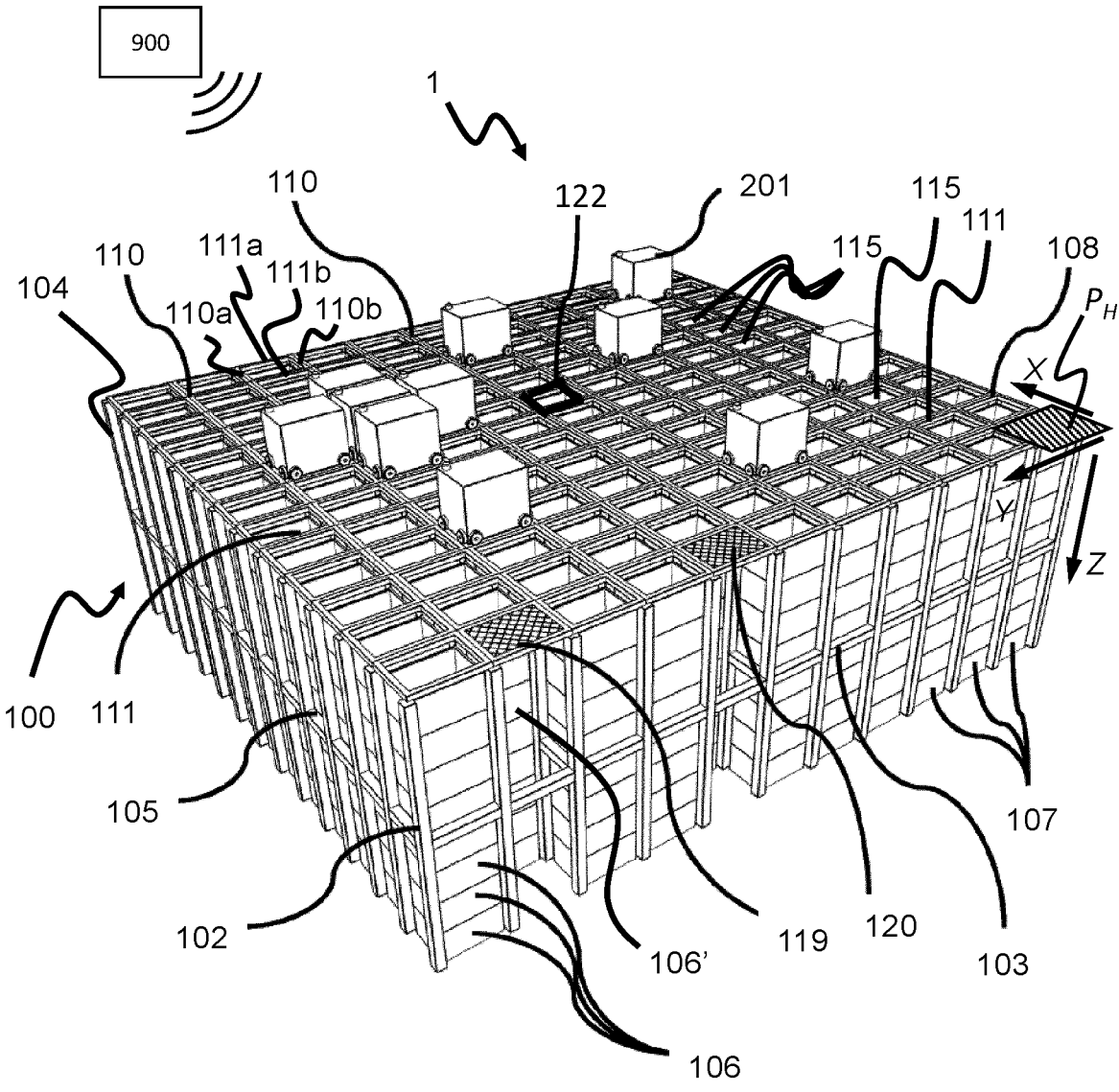
FIG. 1A is a perspective view of a prior art automated storage and retrieval system.

In the following, embodiments of the invention will be discussed in more detail with reference to the appended drawings. It should be understood, however, that the drawings are not intended to limit the invention to the subject-matter depicted in the drawings.

If not otherwise stated, the framework 100 of the automated storage and retrieval system 1 is constructed in accordance with the prior art framework 100 described above in connection with FIGS. 1A to 1D, i.e. a plurality of upright members 102 defining a plurality of storage columns 105 and a rail system 108 of parallel rails 110, 111 in X direction and Y direction arranged across the top of the storage columns 105. More specifically the rail system 108 displays a plurality of grid cells 122, each grid cell 122 comprising a grid opening 115 being delimited by a pair of rails 110a,110b of the first set of rails 110 running in the first direction X and a pair of rails 111a,111b of the second set of rails 111 running in the second direction Y. The footprint of one grid cell 122 is including one grid opening 115 and its delimiting portions of rails 110a,110b,111a,111b as indicated in FIGS. 1C and 1D.

The framework structure 100 can be of any size. In particular it is understood that the framework structure can be considerably wider and/or longer and/or deeper than disclosed in FIG. 1A. For example, the framework structure 100 may have a horizontal extent of more than 700×700 columns and a storage depth of more than twelve containers.

Figure 2:
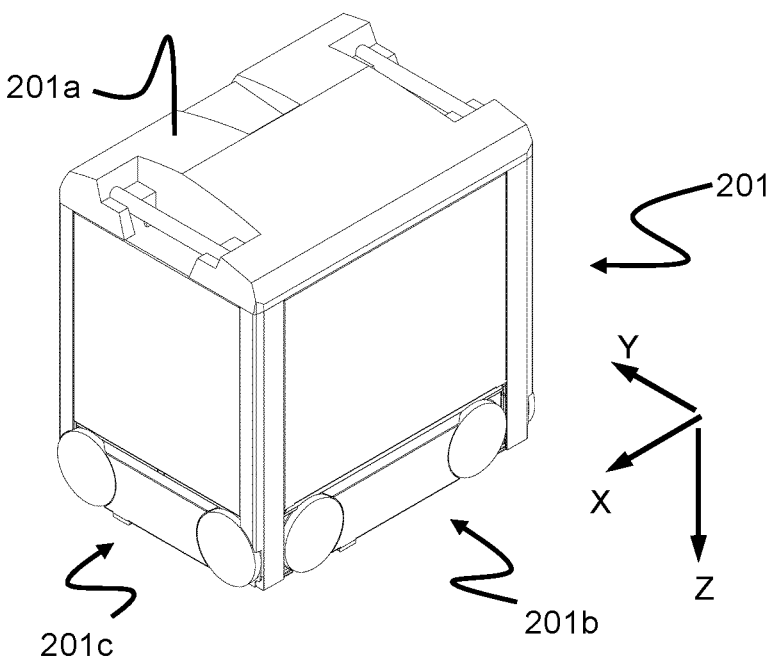
FIG. 2 is a perspective view of a prior art remotely operated container handling vehicle having a centrally arranged cavity for carrying storage containers therein.
Figure 3:
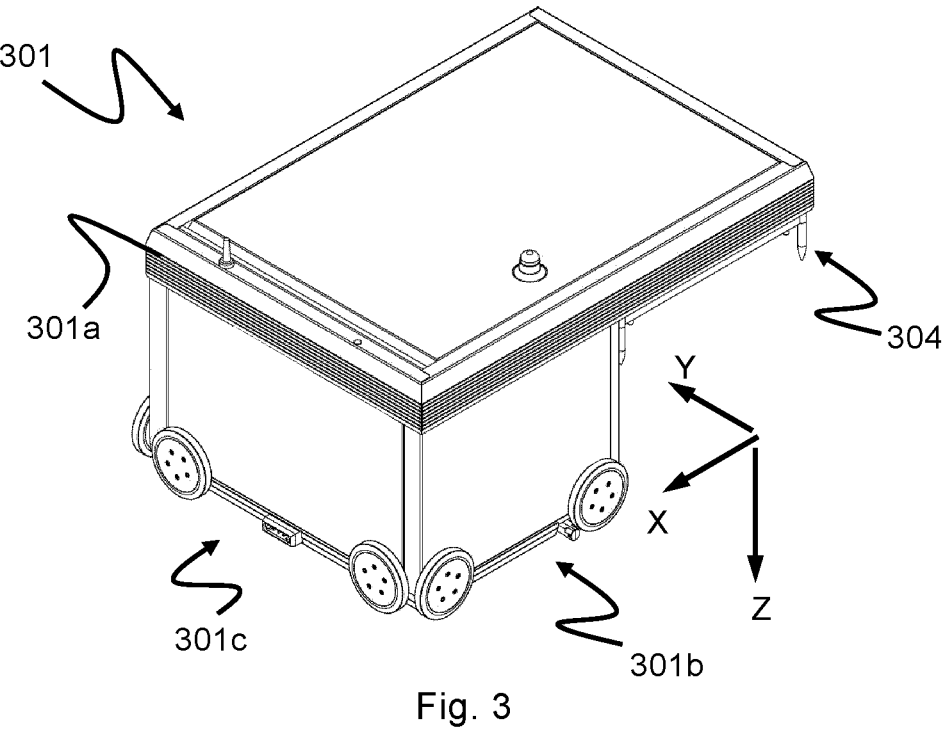
FIG. 3 is a perspective view of a prior art remotely operated container handling vehicle having a cantilever for carrying storage containers underneath.

A plurality of container handling vehicles 201,301, see FIGS. 2 and 3, may operate on the rail system 108 to raise storage containers 106 from, and lower storage containers 106 into, the storage columns 105 as discussed in the background and prior art section.

Further, a remotely operated vehicle according to the present invention is configured to operate on the rail system 108.

Figure 4A:
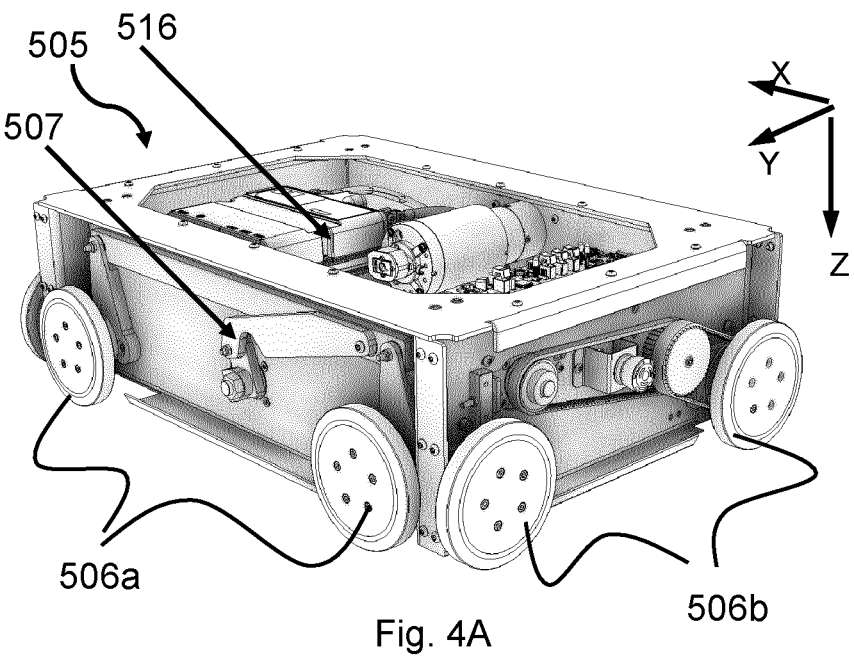
FIGS. 4A and 4B show perspective views of an exemplary base in the form of a wheeled base for a remotely operated vehicle.
Figure 4B:
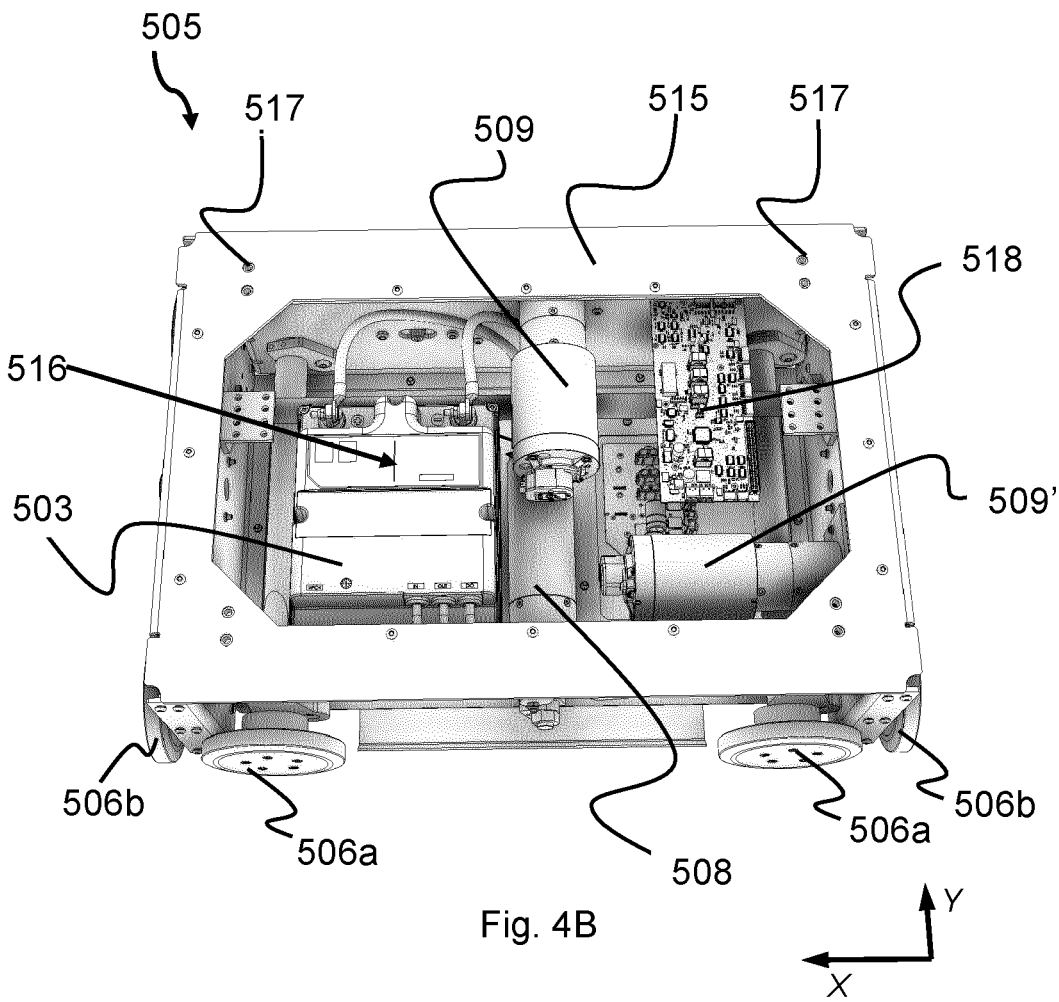

FIGS. 4A and 4B show an exemplary base 505 in the form of a wheeled base unit 505 for such a remotely operated vehicle according to embodiments of the invention. The wheeled base unit 505 features a wheel arrangement 506a, 506b having a first set of wheels 506a for movement in a first horizontal direction X upon a rail system and a second set of wheels 506b for movement in a second horizontal direction Y perpendicular to the first direction X. Each set of wheels comprises two pairs of wheels arranged on opposite sides of the wheeled base unit 505. To change the direction in which the wheeled base unit 505 may travel upon the rail system, one of the sets of wheels 506b is connected to a wheel displacement assembly 507. The wheel displacement assembly 507 is able to lift and lower the connected set of wheels 506b relative to the other set of wheels 506a such that only the set of wheels travelling in a desired direction is in contact with the rail system. The wheel displacement assembly 507 is driven by an electric motor 508. Further, two electric motors 509,509', powered by a power source such as a rechargeable battery 503, are connected to the set of wheels 506a,506b to move the wheeled base unit 505 in the desired direction.

Further referring to FIGS. 4A and 4B, the horizontal periphery of the wheeled base unit 505 is dimensioned to fit within the horizontal area defined by a grid cell, such that two wheeled base units 505 may pass each other on any adjacent grid cells of the rail system. In other words, the wheeled base unit 505 may have a footprint, i.e. an extent in the X and Y directions, which is generally equal to the horizontal area of one grid cell, i.e. the extent of a grid cell in the X and Y directions.

Figures 1B, 1C, 1D:
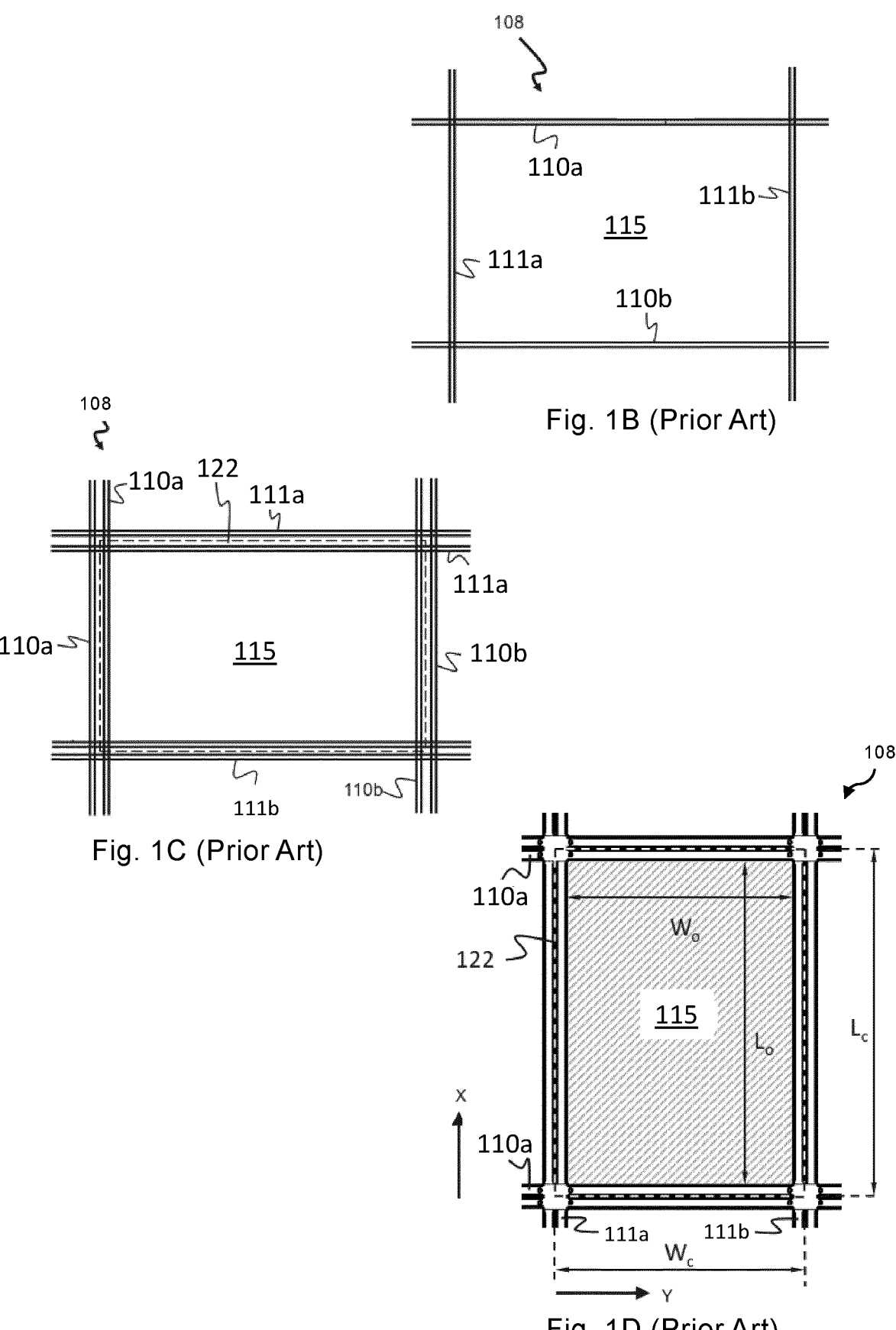
FIG. 1B is a plan view of two sets of single track rails.
FIG. 1C is a plan view of two sets of double track rails.
FIG. 1D is a plan view showing dimensions of a single grid cell (e.g., $W_C \times L_C$)

The vehicle 500 is configured for transport of one or more storage container(s) (106—not shown in FIGS. 4A and 4B) on a rail system, preferably a rail system of an automated storage and retrieval system having a plurality of stacks of storage containers as shown in FIG. 1A. The vehicle 500 is further configured to receive storage bins from a delivery device such as a human operator, a storage container handling vehicle, a gripper, an elevator, a port or a conveyor belt.

All the example embodiments of the inventive vehicle 500 shown in the drawings have a vehicle body 504 with a wheeled base unit 505. The wheeled base unit 505 may be as disclosed in FIGS. 4A and 4B having a first set of wheels 506a arranged on opposite sides of the vehicle body 504 for moving the vehicle 500 along a first horizontal direction X on the rail system 108, and a second set of wheels 506b arranged on other opposite sides of the vehicle body 504 or within the vehicle body 504, for moving the vehicle along a second horizontal direction Y on the rail system, the second direction Y being perpendicular to the first direction X. Further, the wheeled base unit 505 may be the size of a grid cell.

However, other configurations of wheeled base unit could also be used, e.g. having a footprint being larger than the grid cell. Further, the wheeled base unit may comprise at least one set of wheels within a cavity of the vehicle.

A first example embodiment of the remotely operated vehicle will now be discussed in more detail with reference to FIGS. 5A and 5B.

Figure 5A:
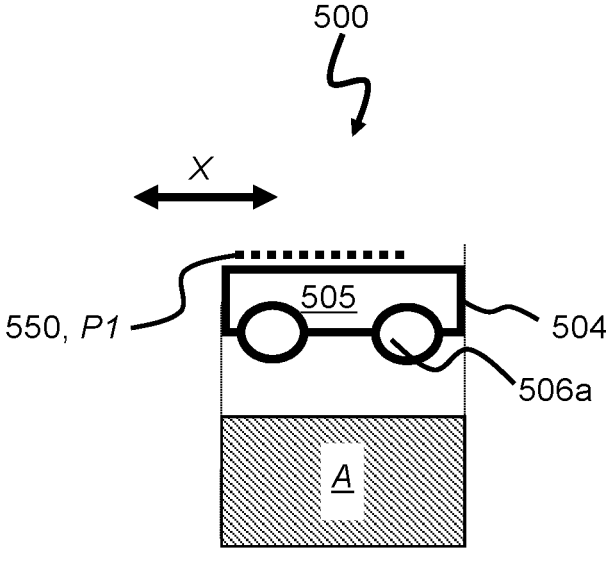
FIGS. 5A and 5B are side views of a remotely operated vehicle according to a first example embodiment of the invention having one slidably mounted storage container support.

FIG. 5A is a side view of the vehicle 500 with a vehicle body 504 having a wheeled base unit 505. Only the first set of wheels 506a are shown.

Further, the vehicle has a storage container support 550 slidably mounted to the vehicle body 504. The slidable direction is indicated by the double arrow in the first direction X, but could alternatively be in the second direction Y. The slidable direction could also comprise a combination of the first and second directions X Y such that the storage container support extends diagonally. The first direction X is equal to the lateral movement of the first set of wheels 506a of the vehicle 500.

The storage container support 550, indicated by dotted lines, is shown being in a first position P1 and the vehicle 500 has a first footprint/vertical projection A as indicated. The first footprint A may be equal to the horizontal extent of a single cell/one grid cell 122 as shown in FIGS. 1B, 1C and 1D.

Upon operation of the slidable storage container support 550, the storage container support 550 is moved from the first position P1 towards a second position P2.

Figure 5B:
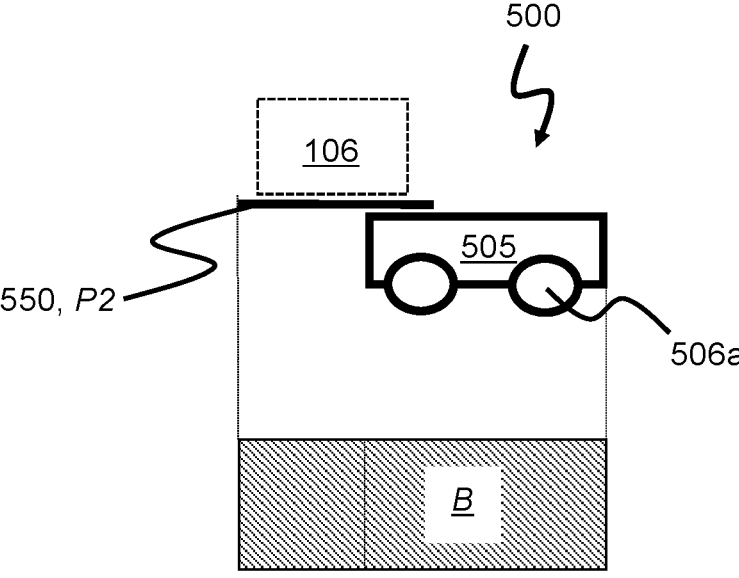

FIG. 5B shows the storage container support 550 in the second position P2 having a storage container 106 arranged thereon. The storage container 106 has been placed on to the storage container support 550 by a delivery device (not shown) as stated above.

When the storage container support 550 is moved from the first position P1 towards the second position P2, the footprint of the vehicle 500 gradually increases having a maximum second footprint B in the second position P2.

Hence, when the storage container support 550 is arranged in the first position P1, the first footprint A of the vehicle 500 can be equal to the grid cell when moving the vehicle 500 on the rail system. Whilst when carrying the storage container 106 when the storage container support 550 is arranged in the second position P2, the second footprint B of the vehicle 500 will be larger than the footprint of the grid cell/first footprint A, for example the second footprint B may be the size of up to two grid cells.

In the operation of the first example embodiment the vehicle 500 may drive to a delivery device for receiving a storage container 106 on to the storage container support 550 when arranged in the second position P2, or may arrange the storage container support 550 in the second position P2 when a delivery device approaches the vehicle 500 for loading a storage container 106 on to the storage container support 550. Hence, the operation of the vehicle 500 not carrying storage container 106 on the container support 550 occupies less space on the rail system than a vehicle 500 carrying storage container 106 on the container support. As known to a person skilled in the art, it is advantageous for the efficiency of a storage system that the vehicles 500 operating in the system have a footprint being as small as possible.

Further, the slidably mounted storage container support 550 can be especially useful in situations where the delivery device cannot be arranged adjacent the vehicle 500, and hence the storage container support 550 may enhance the loading of a storage container 106 by decreasing the distance between the delivery device and the storage container support 550. An example of such delivery device may for example be a human operator or a conveyor belt thereby inter alia minimizing the risk of the storage container 106 being dropped into the rail system or injury of the human operator.

Figures 6A, 6B:
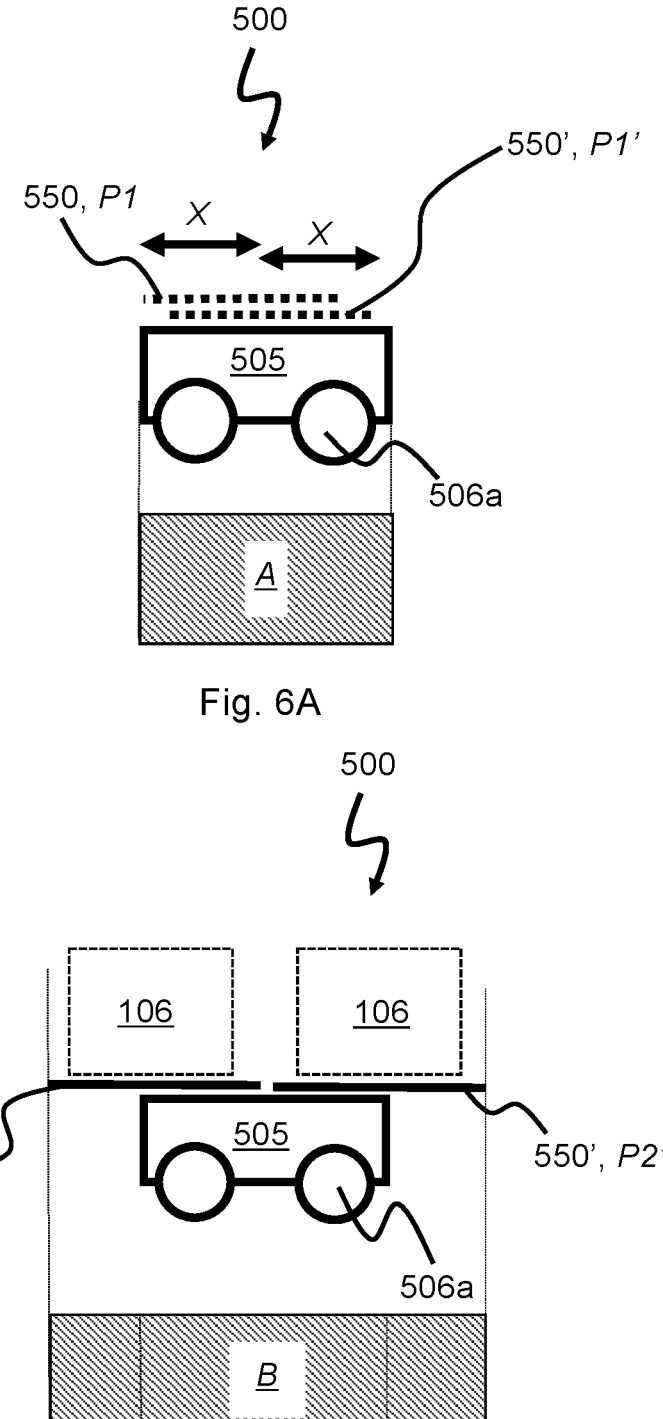
FIGS. 6A and 6B are side views of a remotely operated vehicle according to a second example embodiment of the invention having two slidably mounted storage container supports.

FIGS. 6A and 6B show a second example embodiment of the inventive vehicle 500.

The vehicle 500 is similar to the vehicle 500 of the first example embodiment having the same vehicle body 504 with the same wheeled base unit 505. The difference is that the vehicle 500 of the this second example embodiment has two slidably mounted storage container supports 550,550'; a first storage container support 550 and a second storage container support 550', indicated by dotted lines.

Both of the storage container supports 550,550' are arranged in their first positions P1,P1', and the vehicle 500 has a first footprint A which may be equal to one grid cell of the rail system.

The double arrows indicate that both of the storage container supports 550,550' are sliding in the first direction X. The two storage container supports are however sliding in opposite directions when moving from their respective first positions P1,P1' to their respective second positions P2,P2'.

Hence, by moving one or both storage container supports 550,550' from the first position P1,P1' towards the second position P2,P2' the footprint of the vehicle 500 gradually increases.

FIG. 6B shows the two storage container supports 550, 550' in their second positions P2,P2', each carrying one storage container 106. When both storage container supports 550,550' are arranged in the second positions P2,P2', the vehicle 500 has a maximum second footprint B as shown. The second footprint B may be more than 1.5 grid cells of the rail system and may be approximately equal to two grid cells of the rail system.

Figure 7A:
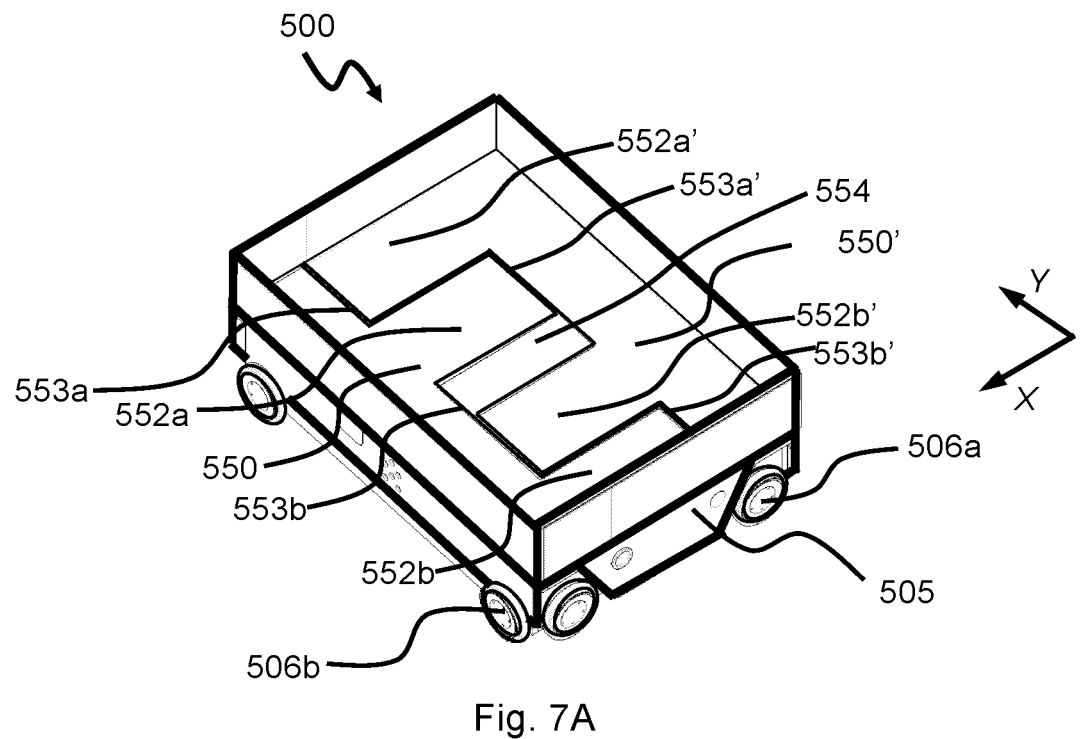
FIGS. 7A and 7B are perspective views of the remotely operated vehicle according to the second example embodiment shown in FIGS. 6A and 6B, respectively.
Figure 7B:
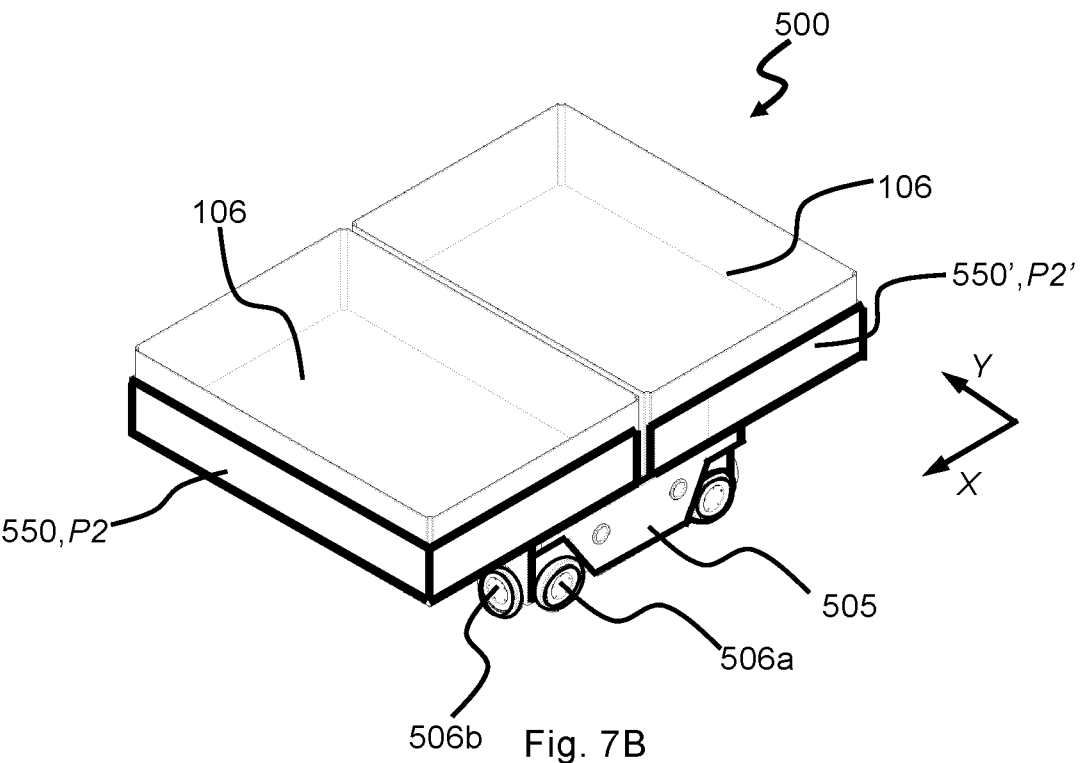

FIGS. 7A and 7B are perspective views of the remotely operated vehicle 500 shown in FIGS. 6A and 6B, respectively.

The first and second storage container supports 550,550' have merging configurations that allows the first footprint A of the vehicle 500 to be equal to the footprint of the wheeled base unit 505.

The first storage container support 550 displays two protrusions 552a,552b and two recesses 553a,553b. Further, the second storage container support 550' displays two protrusions 552a',552b' configured to at least partly merge with the recesses 553a,553b of the first storage container support 550. Further, the second storage container support 550' displays two recesses 553a',553b' which at least partly merge with the protrusions 552a,552b of the first storage container support 550. In the shown embodiment there is a gap/opening 554 between the first and second storage container supports 550,550' when at least partly merged in their first positions P1,P1'. This gap 554 allows inter alia a human operator access to the wheeled base unit 505 of the vehicle 500 for manual separation of the two storage container supports 550,550' if needed.

FIG. 7B shows the vehicle 500 with the first and second storage container supports 550,550' arranged in their second positions P2,P2' each having one storage container 106 arranged thereon as also disclosed in FIG. 6B, and hence the vehicle 500 has a maximum second footprint B, as described in FIG. 6B.

Figure 7C:
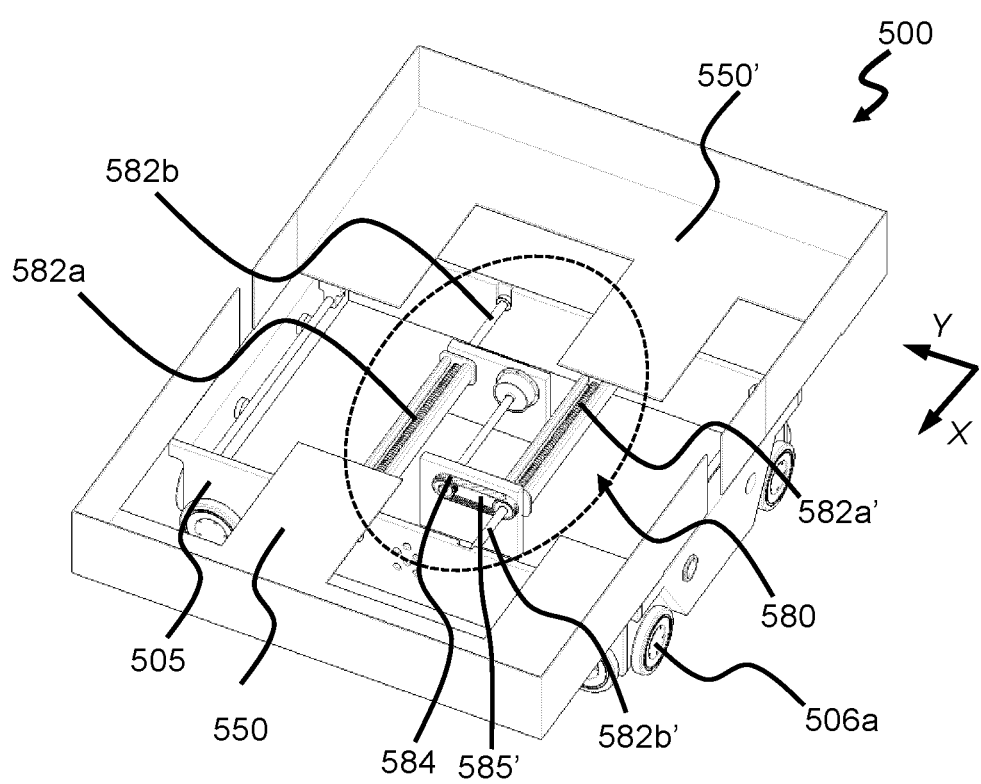
FIG. 7C is a perspective view the remotely operated vehicle as shown in FIG. 7B without storage containers arranged on the storage container supports thereby showing the moving mechanism of the slidable mounted storage container supports.

FIG. 7C is a perspective view the remotely operated vehicle as shown in FIG. 7B without storage containers arranged on the first and second storage container supports 550,550' thereby showing the moving mechanism 580 of the slidable mounted storage container supports 550,550' arranged within the wheeled base unit 505.

Figure 7D:
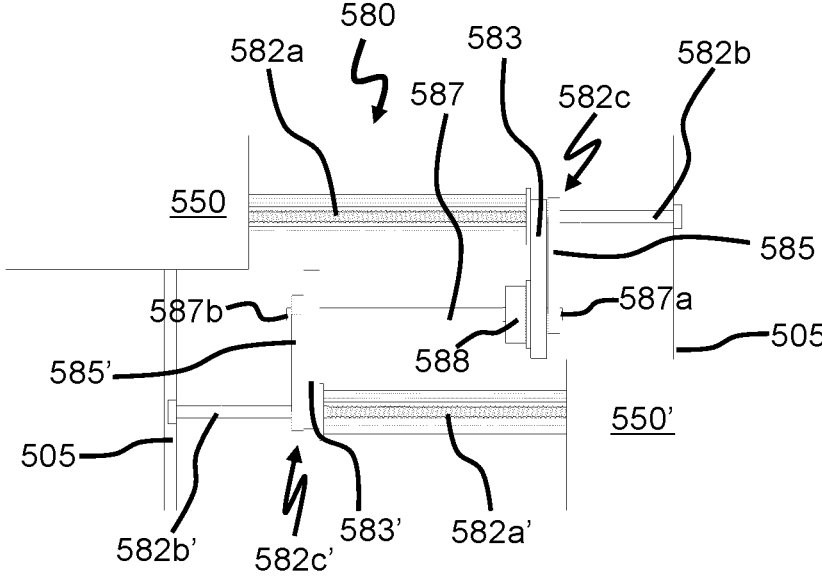
FIG. 7D is a top detailed view of the moving mechanism shown in the dashed circle in FIG. 7C.

The moving mechanism 580 in FIG. 7C is shown in detail in FIG. 7D. The moving mechanism displays a ball screw mechanism 580 which translates rotational movement of two longitudinal shafts 582,582' into linear movement of the first and second storage container supports 550,550'.

In the shown ball screw mechanism 580 the first and second storage container supports 550,550' are moved simultaneously, however, the principle of such mechanism is known to a person skilled in the art, and hence it is obvious that two ball screw mechanisms could be installed independently for moving the two storage container supports 550, 550' individually.

The first longitudinal shaft 582 has a first threaded section 582a which is connected to the first storage container support 550 having a nut (not shown) fixed to the first storage container support 550, and a second unthreaded section 582b rotationally fixed to the wheeled base unit 505 of the container handling vehicle. The interaction between the nut and the rotating first threaded section 582a of the first longitudinal shaft 582 allows for linear movement of the first storage container support 550 along the longitudinal direction of the first threaded shaft 582 along a longitudinal length of the first threaded section 582a.

The second longitudinal shaft 582' has a first threaded section 582a' which is connected to the second storage container support 550' having a nut (not shown) fixed to the second storage container support 550', and a second unthreaded section 582b' rotationally fixed to the wheeled base unit 505 of the vehicle. The interaction between the nut and the rotating first threaded section 582a' of the second longitudinal shaft 582' allows for linear movement of the second storage container support 550' along the longitudinal direction of the second threaded shaft 582' along a longitudinal length of the first threaded section 582a'.

The unthreaded section 582b of first longitudinal shaft 582 and the second unthreaded section 582b' of second longitudinal shaft 582' are rotationally fixed to opposite sides of the wheeled base unit 505 of the vehicle 500.

Both of the shafts 582,582' are indirectly moved in a rotational direction by so-called belt and pinion mechanism. The belt and pinion mechanism is driven by a motor 588 which operates a central longitudinal bar/pinion 587 to move in a rotational motion. The central longitudinal bar 587 is interacting with the first shaft 582 via a first belt 585 and with the second bar 582' via a second belt 585'. The rotational movement of the central longitudinal bar 587 causes the first and second belts 585,585' to move such that the first and second shafts 582,582' are rotated respectively.

The central longitudinal bar 587 is at a first end section 587a supported by a first bracket 583 having an opening which the first end section 587a passes through and at its second end section 587b supported by a second bracket 583' having an opening which the second end section 587b passes through. Both end sections 587a,587b have a pinion structure for moving the first and second belts 585,585' respectively. Further, the first bracket 583 supports the first shaft 582 in that the first shaft 582 passes through an opening of the first bracket 583 such that at a third section 582c of the first shaft 582 which has a pinion structure interacts with the first belt 585, as the first belt 585 extends between and partly around the first end section 587a of the central longitudinal bar 587 and the third section 582c of the first shaft 582. The second bracket 583' supports the second shaft 582' in that the second shaft 582' passes through an opening of the second bracket 583' such that at a third section 582c' of the second shaft 582' which has a pinion structure interacts with the second belt 585', as the second belt 585' extends between and partly around the second end section 587b of the central longitudinal bar 587 and the third section 582c' of the second shaft 582'. Hence, the first belt 585 rotates the first shaft 582 and the second belt 585' rotates the second shaft 582' upon rotating the central longitudinal bar 587.

As the first and second threaded bars 582,582' are having oppositely rotating threads, the first rotational thread 582 moves the first storage container support 550 in a first direction and the second rotational thread 582' moves the second storage container support 550' in a second opposite direction, both along the first direction X.

In the operation of the second example embodiment the vehicle 500 may drive to a delivery device for receiving storage containers 106 on to the storage container supports 550,550' when arranged in their second positions P2,P2', or the vehicle 500 may arrange the storage container supports 550,550' in their second position P2, P2' when a delivery device approaches the vehicle 500 for loading storage containers 106 on to the storage container supports 550,550'. Due to the slidably mounted storage container supports 550,550' more than one storage container 106 can be carried by the vehicle 500 and the vehicle 500 has a bigger footprint when carrying storage containers 106 than when not carrying storage containers 106. Hence, the operation of the vehicle 500 not carrying storage container(s) 106 on the storage container support(s) 550,550' occupies less space on the rail system than the vehicle 500 carrying storage container(s) 106 on the storage container support(s) 550,550'. As known to a person skilled in the art, it is advantageous for the efficiency of a storage system that the vehicle 500 operating in the system has a footprint being as small as possible.

The slidably mounted storage container supports 550,550' can further be especially useful in situations where the delivery device cannot be arranged adjacent the vehicle 500, and hence the storage container supports 550,550' can enhance the loading of storage containers 106 by decreasing the distance between the storage container supports 550,550' and the delivery device. For example, if the delivery device is a conveyor belt or a human operator the risk of the storage container being dropped into the grid or injury of the human operator can be minimized.

Figure 8A:
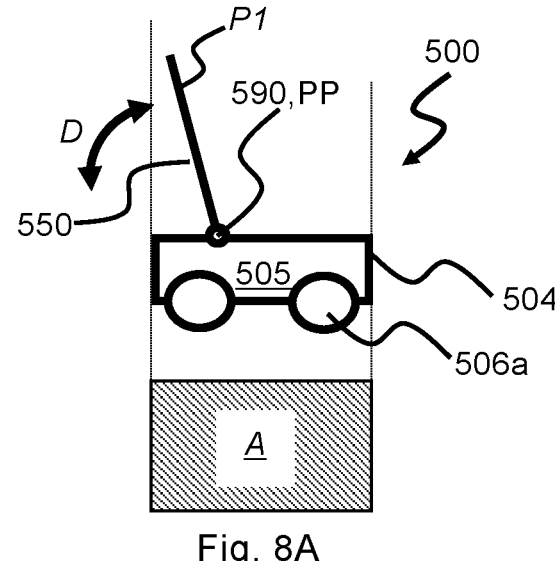
FIGS. 8A and 8B are side views of a remotely operated vehicle according to a third example embodiment of the invention having one pivotally mounted storage container support.
Figure 8B:
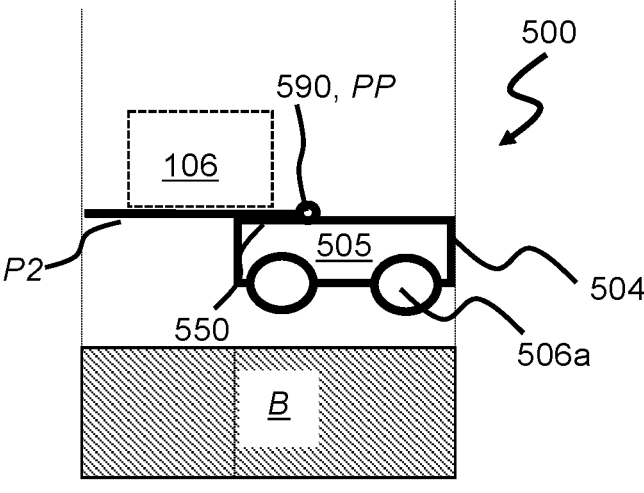

FIGS. 8A and 8B shows the remotely operated vehicle 500 according to a third example embodiment of the invention.

The vehicle 500 is similar to the vehicle 500 of the first example embodiment having the same vehicle body 504 with the same wheeled base unit 505. The difference is that the vehicle 500 of this third example embodiment has one pivotally mounted storage container support 550.

In FIG. 8A the storage container support 550 is arranged in the first position P1 and the first footprint A of the vehicle 500 is equal to the footprint of the wheeled base unit 505 which can be the size of one grid cell of the rail system.

The storage container support 550 is connected to the vehicle body 504 by a pivot connection 590 and movable in a pivoting motion about the pivot point PP of the pivot connection 590. The pivoting motion is shown by the double arrow indicating the pivoting direction D. Hence, the storage container support can operate between a mainly vertical first position P1 as shown in FIG. 8A, and a horizontal second position P2 as shown in FIG. 8B. Thus, the vehicle 500 has a smaller first footprint A when the storage container support 550 is empty, i.e. not carrying a storage container 106 in the first position P1 compared to second footprint B when the storage container support 550 is arranged in the second position P2 holding a storage container 106.

In the operation of the third example embodiment the vehicle 500 may drive to a delivery device for receiving a storage container 106 on to the storage container support 550 when arranged in the second position P2, or may arrange the storage container support 550 in the second position P2 when a delivery device approaches the vehicle 500 for loading a storage container 106 on to the storage container support 550. Hence, the operation of the vehicle 500 not carrying a storage container 106 on the storage container support 550 occupies less space on the rail system than a vehicle 500 carrying a storage container 106 on the storage container support 550.

The pivotally mounted storage container support 550 can be especially useful in situations where the delivery device cannot be arranged adjacent the vehicle 500, and hence the storage container support 550 may enhance the loading of a storage container 106 by decreasing the distance between the delivery device and the storage container support 550. An example of such delivery device may for example be a human operator or a conveyor belt thereby inter alia minimizing the risk of the storage container 106 being dropped into the rail system or injury of the human operator.

Figures 9A, 9B:
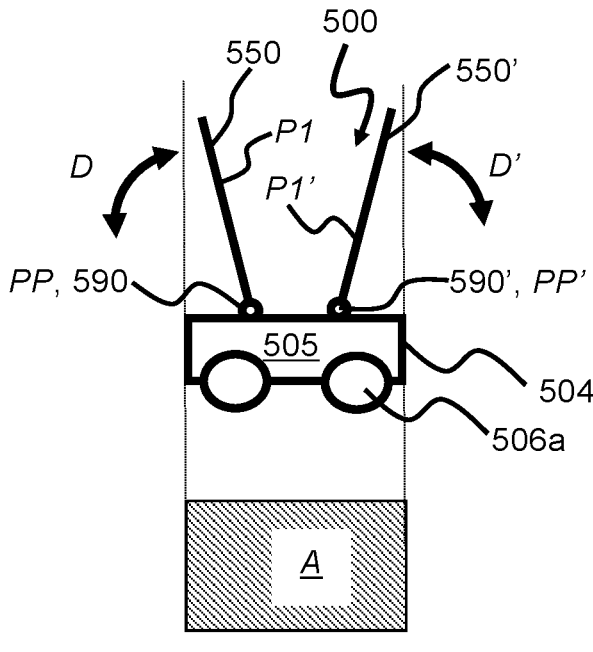
FIGS. 9A and 9B are side views of a remotely operated vehicle according to a fourth example embodiment of the invention having two pivotally mounted storage container supports.

FIGS. 9A and 9B show a fourth example embodiment of the inventive vehicle 500 being similar to the third example embodiment except that the vehicle 500 has two pivotally mounted storage container supports 550,550' instead of one.

Also in this embodiment the vehicle 500 is similar to the vehicle 500 of the first example embodiment having the same vehicle body 504 with the same wheeled base unit 505.

As shown in FIG. 9A the first footprint A of the vehicle 500 corresponds to the footprint of the wheeled base unit 505 of the vehicle 500 when the first and second storage container supports 550,550' are arranged in their respective first positions P1,P1'.

The first storage container support 550 is pivotally mounted to the vehicle body 504 at a first pivot connection 590 allowing the first storage container support 550 to pivot about a first pivot point PP between the first and second positions P1,P2 of the first storage container support 550.

The second storage container support 550' is pivotally mounted to the same vehicle body 504 at a second pivot connection 590' allowing the second storage container support 550' to pivot about a second pivot point PP' between the first and second positions P1',P2' of the second storage container support 550'.

When the first storage container support 550 and second storage container support 550' move from the first position P1,P1' towards the second position P2,P2', the footprint of the vehicle 500 gradually increases until it reaches the maximum footprint B when both storage container supports 550,550' are arranged in their second positions P2,P2'.

One storage container support 550,550' could be moved at the time, or both storage container supports 550,550' can move simultaneously.

The double arrows indicate that both of the storage container supports 550,550' are pivotally moving in a pivoting direction D,D'. The two storage container supports 550,550' are moving on opposite sides of the vehicle 500 when moving from their respective first positions P1,P1' to their respective second positions P2,P2'. Hence, when both storage container support 550,550' are in their second positions P2,P2' they extend in opposite directions from the vehicle along the first direction X.

In the operation of the fourth example embodiment, the vehicle 500 may drive to a delivery device for receiving storage containers 106 on to the storage container supports 550,550' when arranged in their second positions P2,P2', or the vehicle 500 may arrange the storage container supports 550,550' in their second position P2,P2' when a delivery device approaches the vehicle 500 for loading storage containers 106 on to the storage container supports 550,550'. Due to the pivotally mounted storage container supports 550,550' more than one storage container 106 can be carried by the vehicle 500 and the vehicle 500 has a bigger footprint when carrying storage containers 106 than when not carrying storage containers 106. Hence, the operation of a vehicle 500 not carrying storage container(s) 106 on the storage container support(s) 550,550' occupies less space on the rail system than a vehicle 500 carrying storage container(s) 106 on the storage container support 550,550'. As known to a person skilled in the art, it is advantageous for the efficiency of a storage system that the vehicles 500 operating in the system have a small a footprint as possible.

The pivotally mounted storage container supports 550, 550' can further be especially useful in situations where the delivery device cannot be arranged adjacent the vehicle 500, and hence the storage container supports 550,550' can enhance the loading of storage containers 106 by decreasing the distance between the storage container supports 550,550' and the delivery device. For example, if the delivery device is a conveyor belt or a human operator the risk of the storage container being dropped into the grid or injury of the human operator can be minimized.

FIGS. 10A to 10D are perspective views of the remotely operated vehicle 500 according to a fifth example embodiment of the invention having two storage container supports 550,550' in which half of each storage container support 550,550' is pivotally mounted.

Figures 10A, 10B, 10C, 10D:
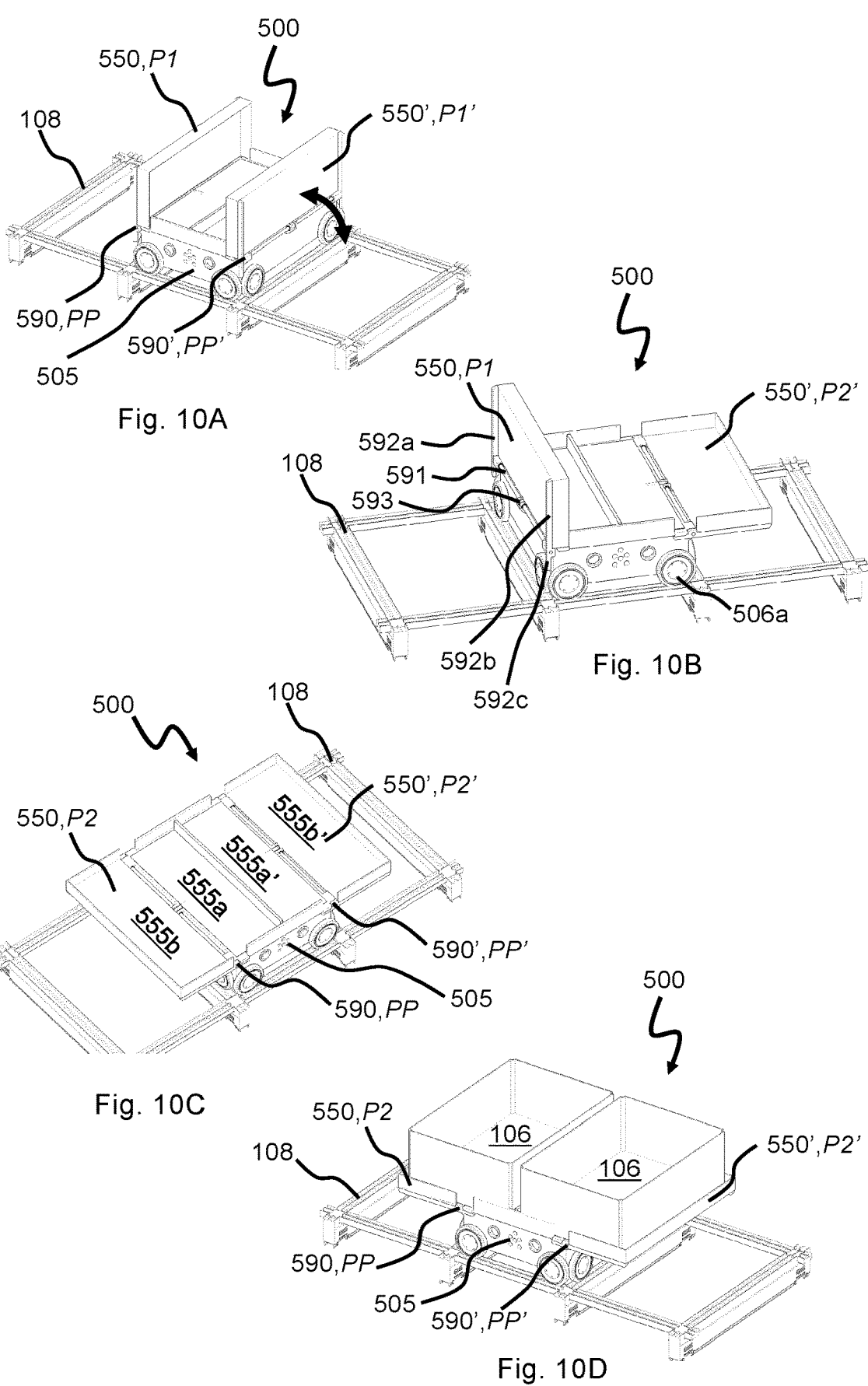
FIGS. 10A to 10D are perspective views of a remotely operated vehicle according to a fifth example embodiment of the invention having two storage container supports of which half is pivotally mounted.

Looking at FIG. 10A the vehicle 500 is arranged on a rail system 108. The vehicle 500 has a first minimum footprint being equal to one grid cell of the rail system 108. Both of the storage container support 550,550' are arranged in their first positions P1,P1'.

The first storage container support 550 is divided in two halves, i.e. a first half 555a and a second half 555b (see FIG. 10C) and the second storage container support 550' is divided into two halves, i.e. a first half 555a' and a second half 555b' (see FIG. 10C).

The first half 555a of the first storage container support 550 is fixed to the vehicle body 504 while the second half 555b is fixed to the first half 555a by a first pivot connection

590 allowing the second half 555b to pivot about a first pivot point PP between first and second positions P1,P2.

Further, the first half 555a' of the second storage container support 550' is fixed to the vehicle body 504 while the second half 555b' is fixed to the first half 555a' by a second pivot connection 590' allowing the second half 555b' to pivot about a second pivot point PP' between a first and second positions P1',P2'.

The operational mechanism of the first pivot connection 590 is shown only with regard to the first storage container support 550 in FIG. 10B as the second pivot connection 590' is operating in a similar manner.

The first pivot connection 590 comprises a rotatable shaft 591 attached to the first half 555a of the first storage container support 550 via a tilting mechanism 593 and fixed to the second half 555b by two longitudinally extending arms 592a, 592b extending below the second half 555b. By rotating the shaft 591 via the tilting mechanism 593, the second half 555b can be pivotally moved between the first and second positions P1,P2. Further, the arms 592a,592b have an extension 592c in the opposite direction extending below the first half 555a of the storage container support 550 when the storage container support 550 is arranged in the second position P2 blocking the pivoting movement to continue in the same direction after the storage container support 550 has moved from the first position P1 to the second position P2.

The tilting mechanism 593 may e.g. be driven by a belt can be electrically operated by an actuator similar to the sliding mechanism discussed with regard to FIGS. 7C and 7D.

A person skilled in the art knows that there are a number of possibilities to choose from for tilting a storage container support by an actuator, and hence the mechanism itself will not be discussed in further detail.

FIG. 10B further shows the second storage container support 550' in the second position P2'. Hence the footprint of the vehicle 500 is larger than the footprint of the vehicle 500 in FIG. 10A. The footprint of the vehicle in FIG. 10B may e.g. be the size of one and a half grid cells of the rail system 108.

In FIG. 10C both of the storage container supports 550, 550' are arranged in the second position P2,P2' and the vehicle 500 hence displays a maximum footprint which can be of two grid cells of the rail system 108.

FIG. 10D also shows both of the storage container supports 550,550' arranged in the second position P2,P2'. Further, in FIG. 10D each of the storage container supports 550,550' carry a storage container 106.

As for the operation of the fourth example embodiment, the operation of the fifth example embodiment of the vehicle 500 may involve driving the vehicle to a delivery device for receiving storage containers 106 on to the storage container supports 550,550' when arranged in their second positions P2,P2', or that the vehicle 500 arranges the storage container supports 550,550' in their second position P2,P2' when a delivery device approaches the vehicle 500 for loading storage containers 106 on to the storage container supports 550,550'. Due to the pivotally mounted storage container support 550,550' more than one storage container 106 can be carried by the vehicle 500 and the vehicle 500 has a bigger footprint when carrying storage containers 106 than when not carrying storage containers 106. Hence, the operation of a vehicle 500 not carrying storage container(s) 106 on the storage container support(s) 550,550' occupies less space on the rail system than a vehicle 500 carrying storage container (s) 106 on the storage container support(s) 550,550'. As known to a person skilled in the art, it is advantageous for the efficiency of a storage system that the vehicle 500 operating in the system has a footprint being as small as possible.

Further, the pivotally mounted storage container supports 550,550' can further be especially useful in situations where the delivery device cannot be arranged adjacent the vehicle 500, and hence the storage container supports 550,550' can enhance the loading of storage containers 106 by decreasing the distance between the storage container supports 550,550' and the delivery device. For example, if the delivery device is a conveyor belt or a human operator the risk of the storage container being dropped into the grid or injury of the human operator can be minimized.

Figure 11A:
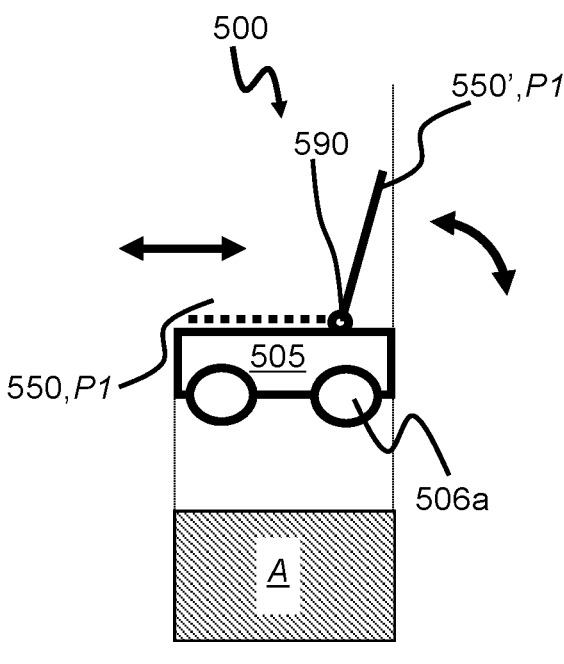
FIGS. 11A and 11B are side views of a remotely operated vehicle according to a sixth example embodiment of the invention having one pivotally mounted storage container support and one slidably mounted storage container support.
Figure 11B:
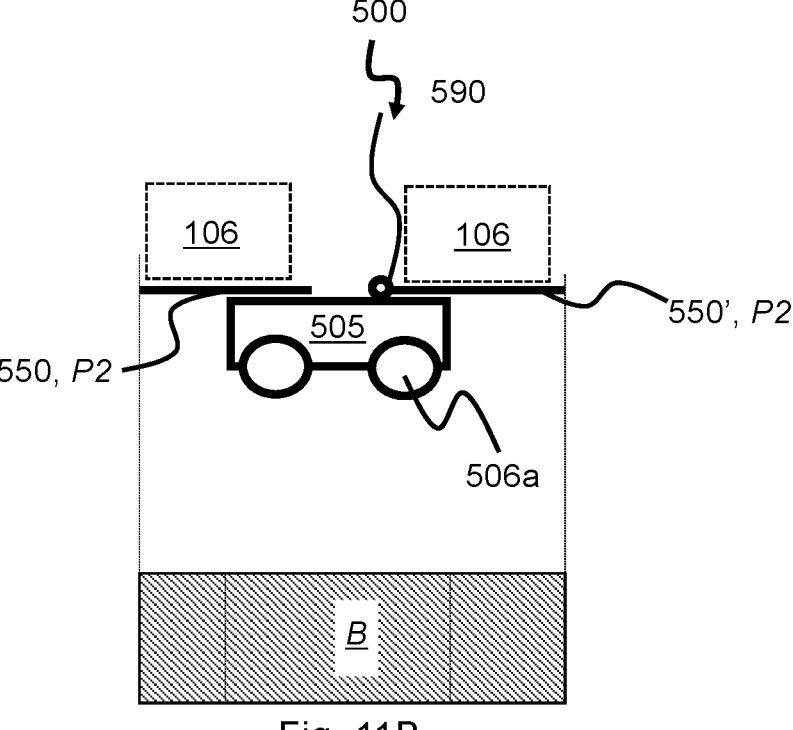

FIGS. 11A and 11B are side views of a remotely operated vehicle according to a sixth example embodiment of the inventive remotely operated vehicle 500 displaying one slidably mounted storage container support 550 and one pivotally mounted storage container support 550'.

The vehicle 500 has a wheeled base unit 505 as shown for the first example embodiment in FIG. 5A.

In FIG. 11A the two storage container supports 550,550' are both arranged in their first positions P1,P1' and the footprint of the vehicle 500 is equal to the footprint of the wheeled base unit 505. Hence the vehicle has a minimum footprint when both of the storage container supports 550, 550' are arranged in their first positions P1,P1'.

FIG. 11B show both storage container supports 550,550' arranged in their second positions P2,P2' and the vehicle has a maximum footprint. The maximum footprint may for example be larger than 1.5 grid cells and may even be substantially equal to two grid cells indicated in FIG. 1A. Also, in this embodiment the storage container supports 550,550' extend in the first direction X in opposite directions, and each storage container support 550,550' is carrying a storage container 106.

The operation of the slidable first storage container support 550 and the pivoting second storage container support 550' can be similar to the shown movements in and FIGS. 7C and 10B, respectively, and are known to a person skilled in the art.

Further, the operation of the vehicle is similar to what is disclosed for the second and fourth example embodiments.

Figure 12A:
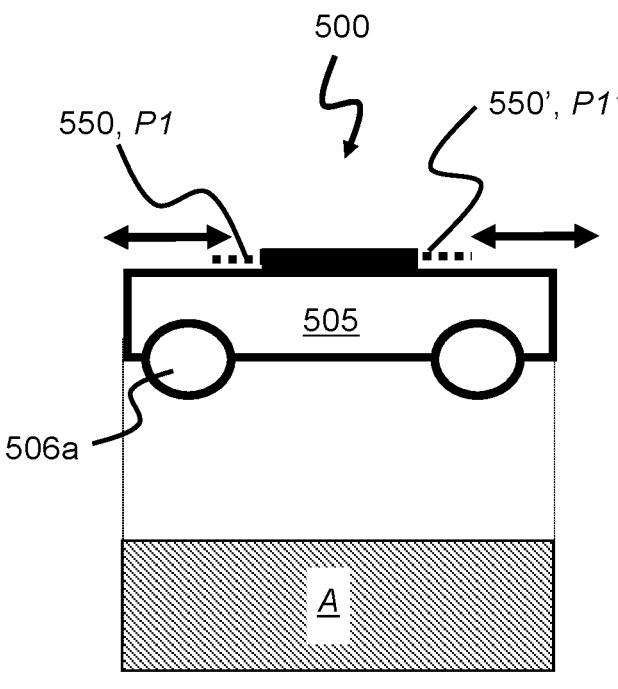
FIGS. 12A and 12B are side views of a remotely operated vehicle according to a seventh example embodiment of the invention having two telescopically mounted storage container supports.
Figure 12B:
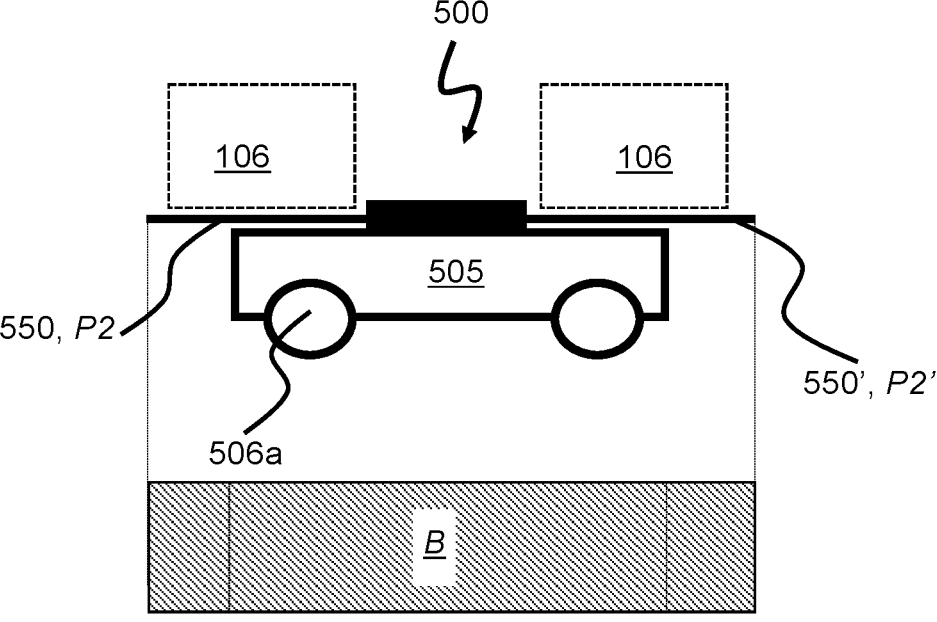

FIGS. 12A and 12B are side views of a remotely operated vehicle 500 according to a seventh example embodiment of the invention having two telescopically mounted storage container supports 550,550'. A person skilled in the art will however understand that the vehicle 500 could only have one telescopic storage container support.

In FIG. 12A both storage container supports 550,550' are arranged in their first positions P1,P1' indicated by the dotted lines and the vehicle 500 has a first footprint A which may be equal to the grid cell of the rail system.

The double arrows indicate that both of the storage container supports 550,550' are telescopically moving in the first direction X The two storage container supports 550,550' are however moving in opposite directions when moving from their respective first positions P1,P1' to their respective second positions P2,P2', similar to the second example embodiment shown in FIGS. 6A and 6B.

Hence, by moving one or both storage container supports 550,550' from the first position P1,P1' towards the second position P2,P2' the footprint of the vehicle 500 gradually increases.

FIG. 12B shows the two storage container supports 550, 550' in their second positions P2,P2', each carrying one storage container 106. When both storage container supports 550,550' are arranged in the second positions P2,P2', the vehicle 500 has a maximum second footprint B as shown. The second footprint B may be equal to the size of two grid cells of the rail system.

The telescopic movement of the storage container supports 550,550' may be similar to the movement of e.g. a scissor lift or a telescopic boom lift operating in the horizontal direction and may be operated by an electrically driven actuator.

In the operation of the fourth example embodiment the vehicle 500 may drive to a delivery device for receiving storage containers 106 on to the storage container supports 550,550' when arranged in their second positions P2,P2', or the vehicle 500 may arrange the storage container supports 550,550' in their second position P2,P2' when a delivery device approaches the vehicle 500 for loading storage containers 106 on to the storage container supports 550,550'. Due to the pivotally mounted storage container supports 550,550' more than one storage container 106 can be carried by the vehicle 500 and the vehicle 500 has a bigger footprint when carrying storage containers 106 than when not carrying storage containers 106. Hence, the operation of a vehicle 500 not carrying storage container(s) 106 on the storage container support(s) 550,550' occupies less space on the rail system than a vehicle 500 carrying storage container(s) 106 on the storage container support(s) 550,550'. As known to a person skilled in the art, it is advantageous for the efficiency of a storage system that the vehicles 500 operating in the system have as small a footprint as possible.

The pivotally mounted storage container supports 550, 550' can further be especially useful in situations where the delivery device cannot be arranged adjacent the vehicle 500, and hence the storage container supports 550,550' can enhance the loading of storage containers 106 by decreasing the distance between the storage container supports 550,550' and the delivery device. For example, if the delivery device is a conveyor belt or a human operator the risk of the storage container being dropped into the grid or injury of the human operator can be minimized.

The operation of the vehicle 500 may be similar to the operation disclosed for the second and fourth example embodiments.

Figure 13A:
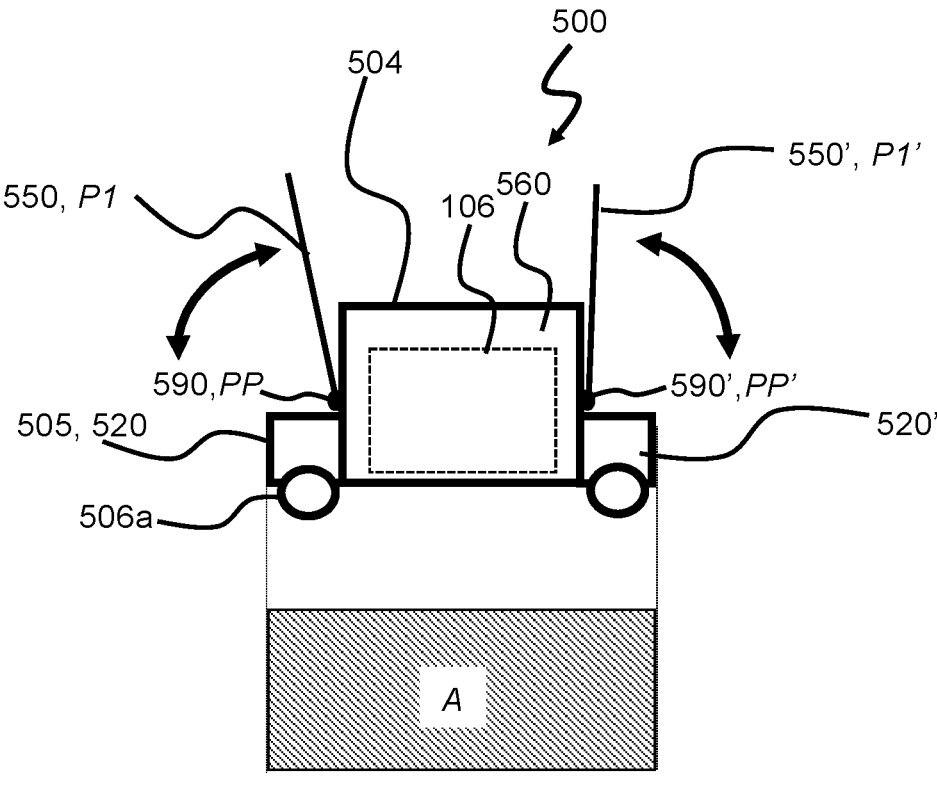
FIGS. 13A to 13C are side views of a remotely operated vehicle according to an eighth example embodiment of the invention wherein the vehicle is a container handling vehicle having a centrally arranged cavity and two pivotally mounted storage container supports.
Figure 13B:
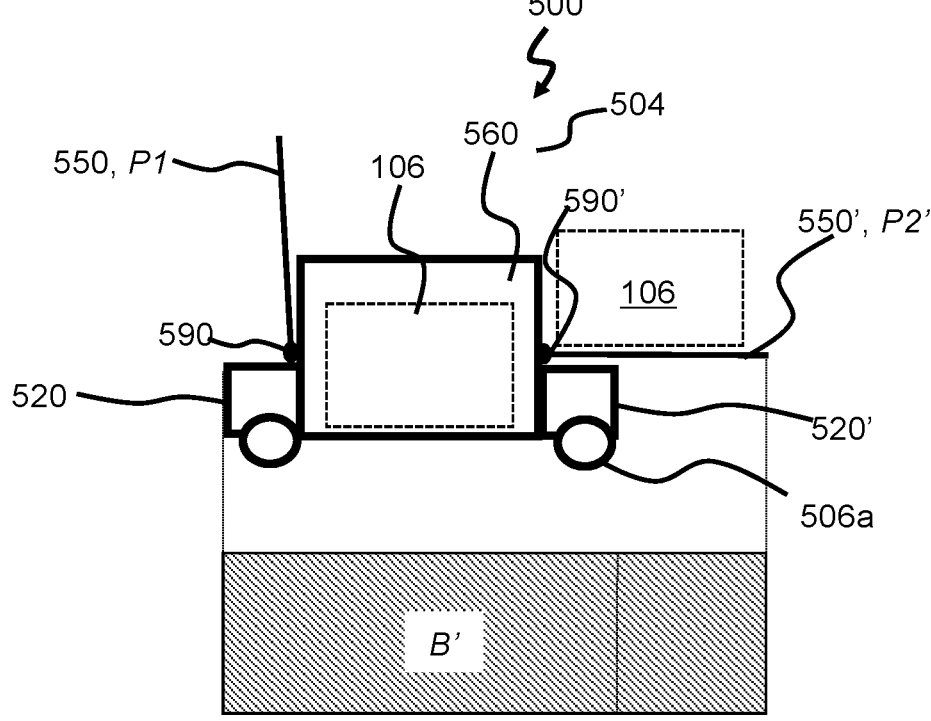
Figure 13C:
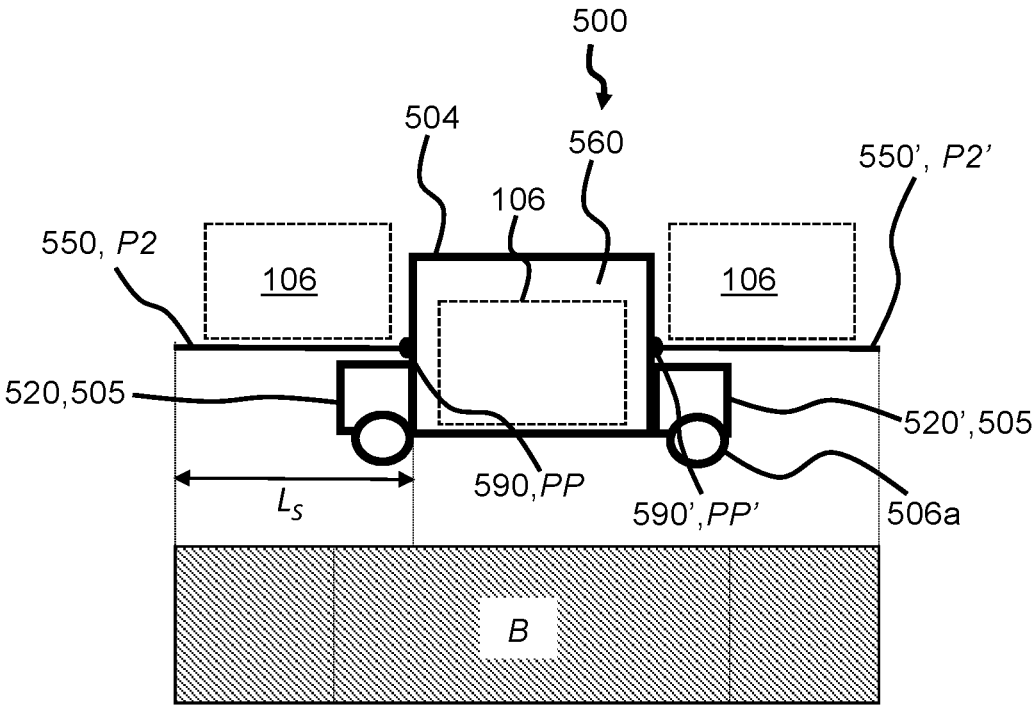

FIGS. 13A to 13C are side views of a remotely operated vehicle 500 according to an eighth example embodiment of the invention. In this embodiment the vehicle is a remotely operated container handling vehicle 500.

The container handling vehicle 500 displays a vehicle body 504 having a cavity 560 therein for receiving and delivering storage containers 106 to and from a storage position within the storage grid below the rail system. Hence the cavity has a lifting device (not shown in FIGS. 13A to 13C) for this operation. Such operation is known to a person skilled in the art and will not be discussed in detail.

Further, the wheeled base unit 505 displays two stabilizing structures, a first stabilizing structure 520 and a second stabilizing structure 520', and the vehicle body 504 displays two pivotally mounted storage container supports, a first storage container support 550 and a second storage container support 550', fixed to the outer surface of the vehicle body 504 by pivot connections 590,590'.

Instead of or in addition to the shown stabilizing structures 520,520', the storage container supports 550,550' may comprise support wheels (not shown) which may pivot from or be provided on the storage container support extending in a vertical direction from below the storage container support for interacting with the rail system.

In FIG. 13A the two storage container supports 550,550' are arranged in their first positions P1,P1'. The first footprint A of the vehicle 500 is equal to the footprint of the vehicle base 505 which includes the stabilizing structures 520,520'. Footprint A may be between the size of one and two grid cells on the rail system shown in FIG. 1A, for example the size of two grid cells.

FIG. 13B shows the first storage container support 550 arranged in its first position P1 and the second storage container support 550' arranged in its second position P2'. Hence the vehicle 500 has an intermediate footprint B' which is larger than the first footprint A. The intermediate footprint may for example have the size of two and a half grid cells.

When the two storage container supports 550,550' are moved both into their second positions P2,P2' the footprint increases until it reaches a maximum second footprint B when both storage container supports 550,550' are arranged in their second positions P2,P2' as shown in FIG. 13C. This second footprint may have the size of for example three grid cells.

As illustrated in the FIG. 13C the first stabilizing structure 520 of the vehicle base unit 505 extends directly below the first storage container support 550 and a second stabilizing structure 520' extends directly below the second storage container support 550' ensuring stability to the vehicle 500 hindering it from tilting. Hence, the two stabilizing structures 520,520' extend from opposite sides 504a, 504b of the vehicle body 504 along the horizontal plane of the grid structure in the first direction X. Each storage container support 550,550' carries a storage container 106. Further, the vehicle lift (not shown in FIG. 13C) within the cavity 560 carries a storage container 106. Hence, the vehicle 500 carries three storage containers 106. The storage containers 106 arranged on the storage container supports 550,550' are arranged thereon by a deliver device (not shown), while the storage container 106 within the cavity 560 can be picked up from the vehicle lift of the vehicle 500 itself.

The first and second storage container supports 550,550' extend in the first horizontal direction X when arranged in the second positions P2,P2'. Further, each of the stabilizing structures 520,520' extend about 50% of a total length $L_S$ of each storage container support 550,550'.

The pivot connections 590,590' connecting the storage container supports 550,550' to the vehicle body 504 are arranged on top of and adjacent the stabilizing structures 520,520'.

Figures 14A, 14B:
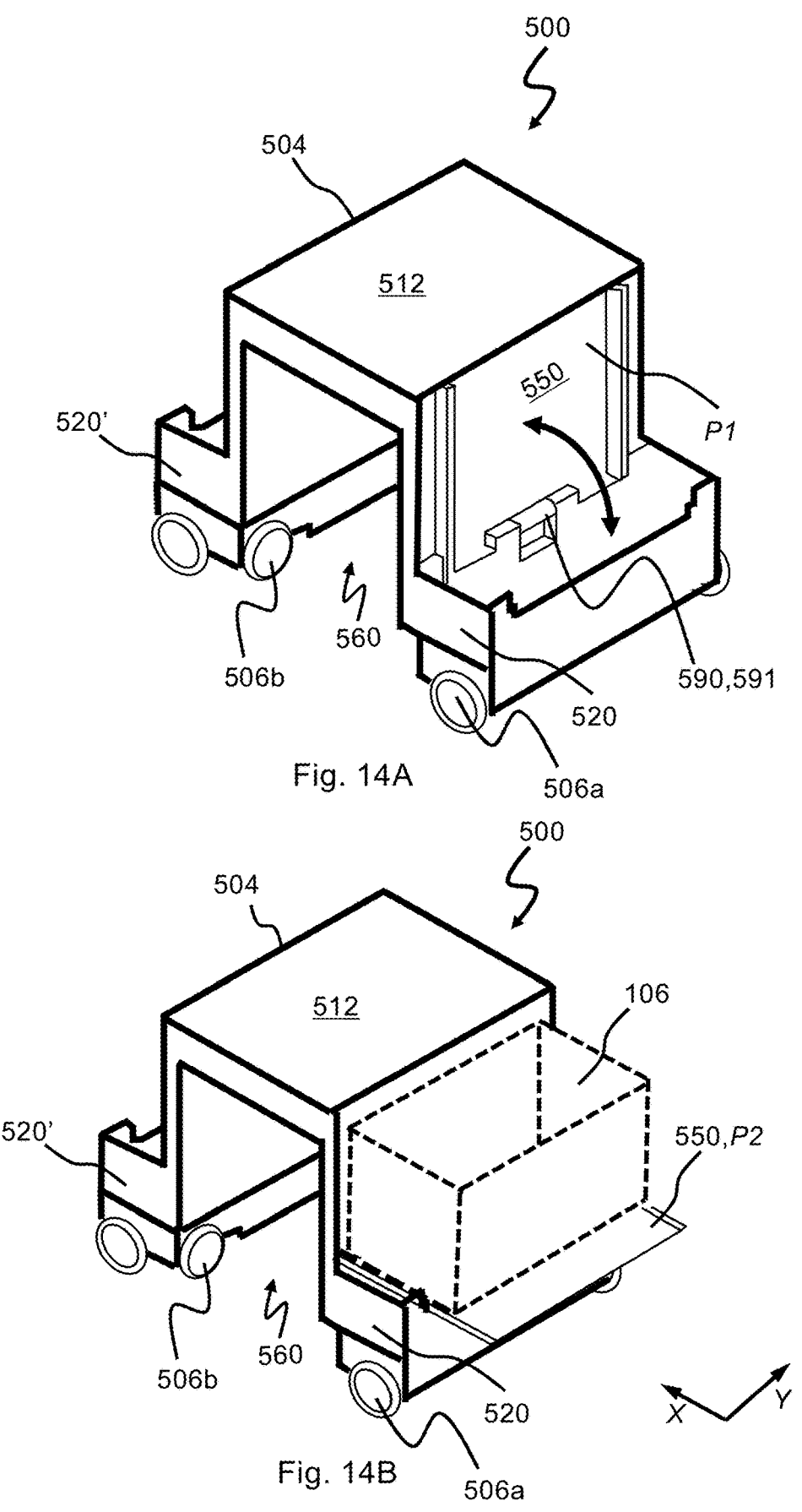
FIGS. 14A and 14B are perspective views of the remotely operated vehicle according to the eighth example embodiment of the invention shown in FIGS. 13A and 13B respectively.

FIGS. 14A and 14B are perspective views of the remotely operated vehicle according to the eighth example embodiment of the invention shown in FIGS. 13A and 13B respectively.

As shown in FIG. 14A, the first storage container support 550 is pivoting about a shaft 591 of the first pivot connection 590 which can work similar to or as disclosed for the pivoting half storage container support in FIGS. 10A to 10D. As such operation is known to a person skilled in the art it will not be discussed further.

The vehicle 500 has a vehicle body 504 with a cavity 560 centrally arranged within the vehicle body 504, a top cover 512 covering the top of the vehicle body 504. A first set of four wheels 506a mounted in parallel with the outer walls of the first and second stabilizing structures 520,520' and a second set of four wheels 506b mounted on the inside of the cavity 560, parallel to the inner walls of the vehicle body 504. The first and second sets of wheels 506a,506b are oriented perpendicular to each other.

As shown, the wheeled base unit 505 is different from the wheeled base units disclosed for the above-mentioned example embodiments one to seven. The second set of wheels 506b are arranged within the cavity 560 ensuring that the footprint of the wheeled base unit 505 is as small as possible when the storage container supports 550,550' are arranged in their first positions P1,P1'. The first set of wheels 506a arranged to move the vehicle along the first direction X are arranged outside the wheeled base unit 505.

The operation of the vehicle 500 may be similar to the operation of the fourth example embodiment of the vehicle 500, but wherein the vehicle 500 is also configured to move storage containers 106 in and out of the storage columns.

Figure 15:
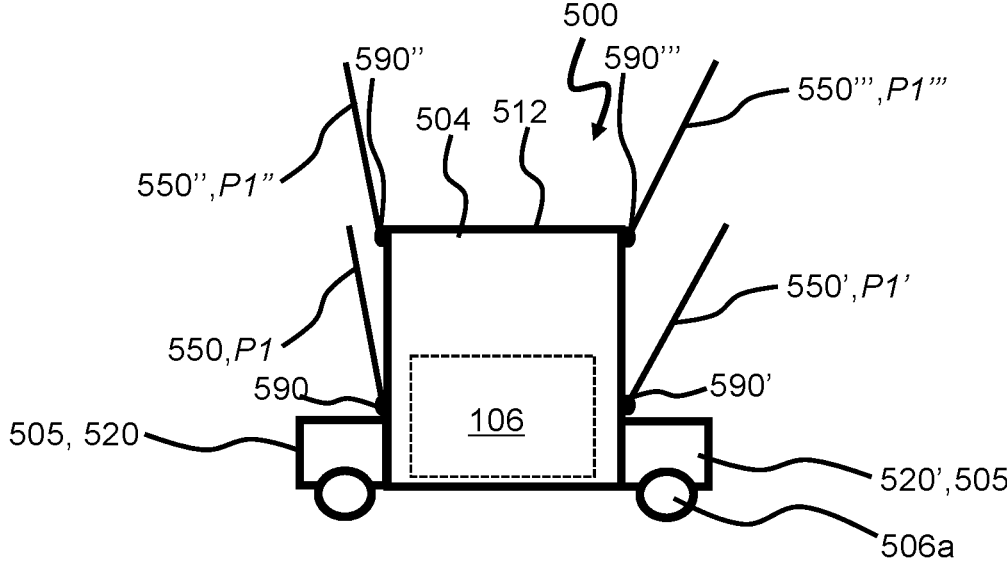
FIG. 15 is a side view of a remotely operated vehicle according to a ninth example embodiment of the invention wherein the vehicle is a container handling vehicle having a centrally arranged cavity and four pivotally mounted storage container supports.

FIG. 15 is a side views of a remotely operated container handling vehicle 500 similar to the one shown in FIGS. 13 and 14. However, the vehicle 500 according to a ninth example embodiment of the invention shown in FIG. 15 displays four pivotally mounted storage container supports 550,550',550",550'''. Two of the storage container supports, the first and the second storage container supports 550,550' are arranged as shown in the eighth embodiment, having the pivot connections 590,590' arranged adjacent the upper part of the stabilizing structures 520,520'. The other two storage container supports, the third and the fourth storage container supports 550",550''' are arranged directly above the first and second storage container supports 550,550' respectively being separated at a height being larger than the height of one storage container 106.

In the operation of the ninth example embodiment vehicle, the vehicle 500 may drive to a delivery device for receiving storage containers 106 on to the storage container supports 550,550',550",550''' when arranged in their second positions P2,P2',P2",P2''' or the vehicle 500 may arrange the storage container supports 550,550',550",550''' in their second position P2, P2',P2",P2''' when a delivery device approaches the vehicle 500 for loading storage containers 106 on to the storage container supports 550,550',550", 550'''. Due to the four pivotally mounted storage container supports 550,550',550",550''' four storage containers 106 can be carried by the vehicle's 500 storage container supports 550,550',550",550''' and the vehicle 500 has a bigger footprint when carrying storage containers 106 on storage container supports 550,550',550",550''' than when not carrying storage containers 106 on storage container supports 550,550',550",550'''. Hence, the operation of a vehicle 500 not carrying storage containers 106 on the storage container supports 550,550',550",550''' occupies less space on the rail system than a vehicle 500 carrying storage container 106 on storage container supports 550,550',550",550'''. As known to a person skilled in the art, it is advantageous for the efficiency of a storage system that the vehicle 500 operating in the system has a footprint being as small as possible.

The vehicle 500 may further carry a storage container 106 within the cavity 560 of the vehicle 500 as disclosed for the eighth example embodiment. Further, the vehicle 500 may also carry a container 106 on the top cover 512 of the vehicle body 504.

The pivotally mounted storage container supports 550, 550',550",550''' can further be especially useful in situations where the delivery device cannot be arranged adjacent the vehicle 500 as disclosed for the first example embodiment.

Figures 16A, 16B:
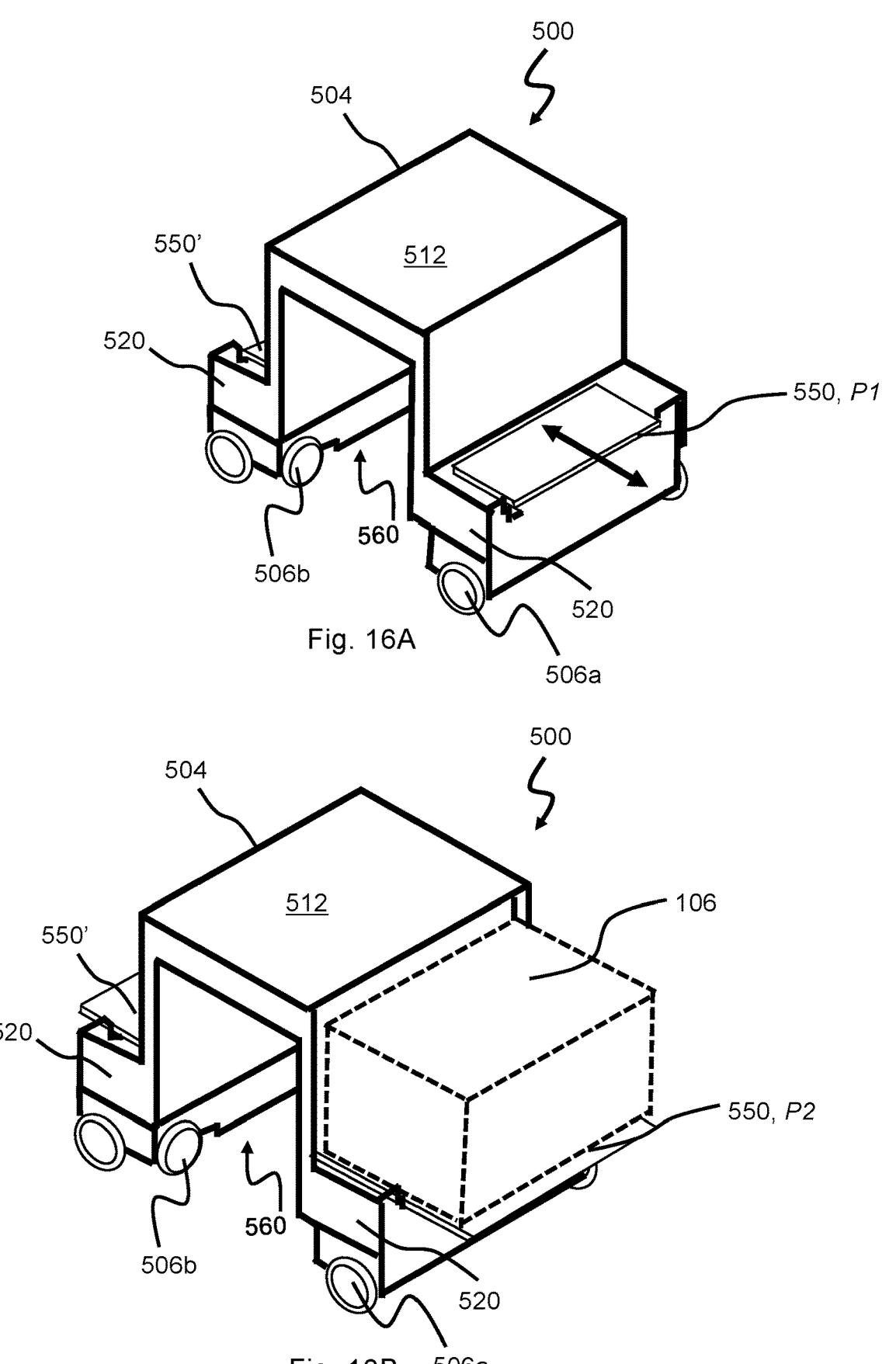
FIGS. 16A and 16B are perspective views of the remotely operated vehicle according to the tenth example embodiment of the invention wherein the vehicle is a container handling vehicle having a centrally arranged cavity and two telescopically mounted storage container supports.

FIGS. 16A and 16B are perspective views of the remotely operated container handling vehicle 500 according to the tenth example embodiment of the invention. The vehicle body is the same as shown for the eighth embodiment in FIGS. 13 and 14, but where the vehicle 500 displays two telescopically mounted storage container supports 550,550'.

The storage container supports 550,550' are arranged directly above and adjacent the two supporting structures 520,520'. Further, both storage container supports 550,550' extend in the first direction X in the opposite direction from each other.

In FIG. 16A both storage container supports 550,550' are in their first retracted positions P1,P1', the double arrow indicating the direction of the telescopic first storage container support 550 when moved between the first position P1 and the second position P2. In this first position the horizontal extent of the first and second storage container supports 550,550' in the horizontal plane are less than the horizontal extent of the first and second support structure 520,520', respectively. Hence, the first footprint of the vehicle 500 when the storage container supports 550,550' are arranged in their first positions P1,P1' is equal to the footprint of the vehicle body 504 which includes the first and second stabilizing structures 520,520'.

In FIG. 16B, the first storage container support 550 is arranged in the second position P2. Hence, the footprint of the vehicle 500 is larger than the footprint of the vehicle in FIG. 16A as it also involves the footprint of the first storage container support 550 extending beyond the footprint of the vehicle body 504.

In the operation of the tenth example embodiment the vehicle 500 is similar to the operation of the ninth example embodiment.

Figures 17A, 17B:
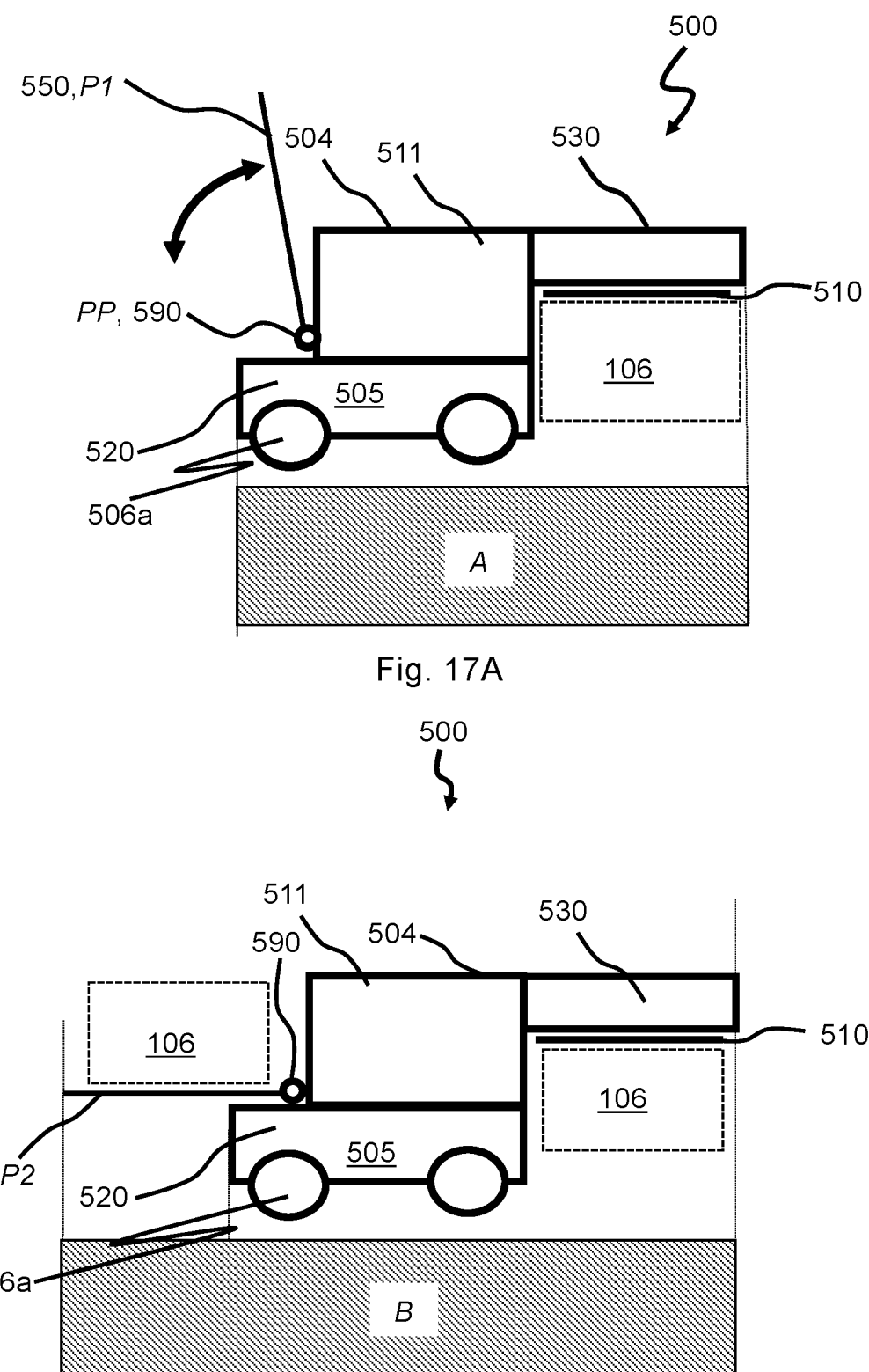
FIGS. 17A and 17B are side views of a remotely operated vehicle according to an eleventh example embodiment of the invention wherein the vehicle is a cantilever container handling vehicle having one pivotally mounted storage container support.

FIGS. 17A and 17B are side views of a remotely operated vehicle 500 according to an eleventh example embodiment of the invention where the remotely operated vehicle 500 is a cantilever remotely operated container handling vehicle 500 having one pivotally mounted storage container support 550. An example similar cantilever container handling vehicle is shown in FIG. 3. The vehicle according to the eleventh example embodiment has a lifting device 510 for lifting and lowering a container 106 to and from a position below the cantilever 530.

The cantilever vehicle 500 shown in FIGS. 17A and 17B differ from the vehicle in FIG. 3 in that the vehicle 500 has a different wheeled base unit 505 and further the vehicle 500 comprises a pivotally mounted storage container support 550.

The vehicle body 504 has a vertically extending structure 511 extending from the base 505. The cantilever 530 is fixed to the vertically extending structure 511 at the upper end thereof. Below the cantilever 530 is a lifting device 510 for raising and lowering a storage container 106 to and from a position below the cantilever 530.

FIG. 17A shows the storage container support 550 arranged in a first position P1 having a vertical component and being mainly arranged in a vertical third direction Z. The storage container support 550 is pivotally mounted to the vehicle body 504 via pivot connection 590 displaying a pivot point PP about which the storage container support 550 is pivoting when moving between the first position P1 and second position P2.

The vehicle comprises a wheeled base unit 505 having a stabilizing structure 520 for stabilizing the vehicle 500 avoiding inter alia tilting of the vehicle 500. The stabilizing structure 520 extends in the first horizontal plane in the first horizontal direction X.

The storage container support 550 is arranged directly above and adjacent the stabilizing structure 520 when the storage container support 550 is arranged in the second position P2 as shown in FIG. 17B.

As shown, the vehicle has a minimum first footprint A when the storage container support 550 is arranged in the first position P1, and a second maximum footprint B when the storage container support 550 is arranged in the second position P2.

The cantilever 530 of the vehicle 500 extends in the first horizontal direction X in the opposite direction to the storage container support 550 when the storage container support 550 is arranged in the second position P2. As shown in FIG. 17B the cantilever 530 is arranged at an opposite side of the vehicle body 504 compared to a position of the storage container support 550.

The first footprint A of the vehicle 500 is shown being the size of about 2.3 times one grid cell. This is mainly due to the width of the vertically extending structure 511 along the first direction X which may be smaller than shown. If the vehicle comprises a smaller width of the vertically extending structure, the size of wheeled base unit can also be reduced such that the first footprint A can be from 1.5 to 2 times a grid cell.

In the operation of the eleventh example embodiment vehicle 500, the vehicle 500 may drive to a delivery device for receiving the storage container 106 on to the storage container support 550 when arranged in its second positions P2 or the vehicle 500 may arrange the storage container support 550 in its second position P2 when a delivery device approaches the vehicle 500 for loading storage containers 106 on to the storage container support 550. The vehicle 500 has a bigger footprint when carrying the storage container 106 on the storage container support 550 than when not carrying the storage container 106 on the storage container support as the storage container support 550 will be arranged in the first position P1. Hence, the operation of a vehicle 500 not carrying storage the container 106 on the storage container support 550 occupies less space on the rail system than the vehicle 500 carrying storage container 106 on the storage container support 550. As known to a person skilled in the art, it is advantageous for the efficiency of a storage system the vehicle 500 operating in the system has a footprint being as small as possible.

The pivotally mounted storage container support 550 can further be especially useful in situations where the delivery device cannot be arranged adjacent the vehicle 500 as disclosed for the first example embodiment.

Figures 18A, 18B:
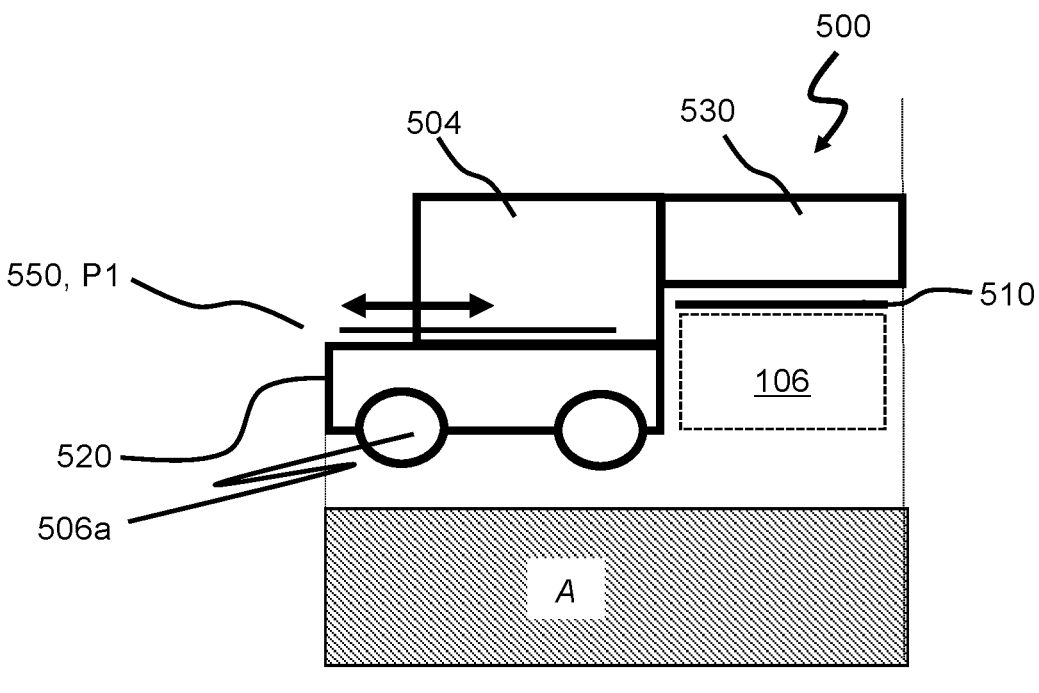
FIGS. 18A and 18B are side views of a remotely operated vehicle according to a twelfth example embodiment of the invention wherein the vehicle is a cantilever container handling vehicle having one slidably mounted storage container support.

FIGS. 18A and 18B are side views of a remotely operated vehicle 500 according to a twelfth example embodiment of the invention. The vehicle 500 is very similar to the vehicle of the eleventh example embodiment being a cantilever container handling vehicle. The difference between the eleventh and twelfth example embodiment is that the twelfth example embodiment has a slidably arranged storage container support 550.

FIG. 18A discloses the slidably arranged storage container support 550 in the first position P1, and the vehicle 500 having a first minimum footprint A which may be about the size of two and a half grid cells as shown in FIG. 1A.

The cantilever 530 of the vehicle 500 extends in the first horizontal direction X in the opposite direction to the storage container support 550 when the storage container support 550 is arranged in the second position P2 as shown in FIG. 18B. When the storage container support is in the second position P2 the vehicle has a maximum second footprint B being larger than the first footprint A. The second footprint B may for example be the size of three grid cells.

The storage container support 550 may slide into a groove within the vehicle body 504 when arranged in the first position P1. The sliding motion may be operated by a mechanism as shown for the sliding storage container supports in the second example embodiment.

The operation of the vehicle 500 in the twelfth example embodiment will be similar to the operation of the eleventh example embodiment except from the fact that the storage container support 550 is slidable instead of pivotally mounted.

Figure 19A:
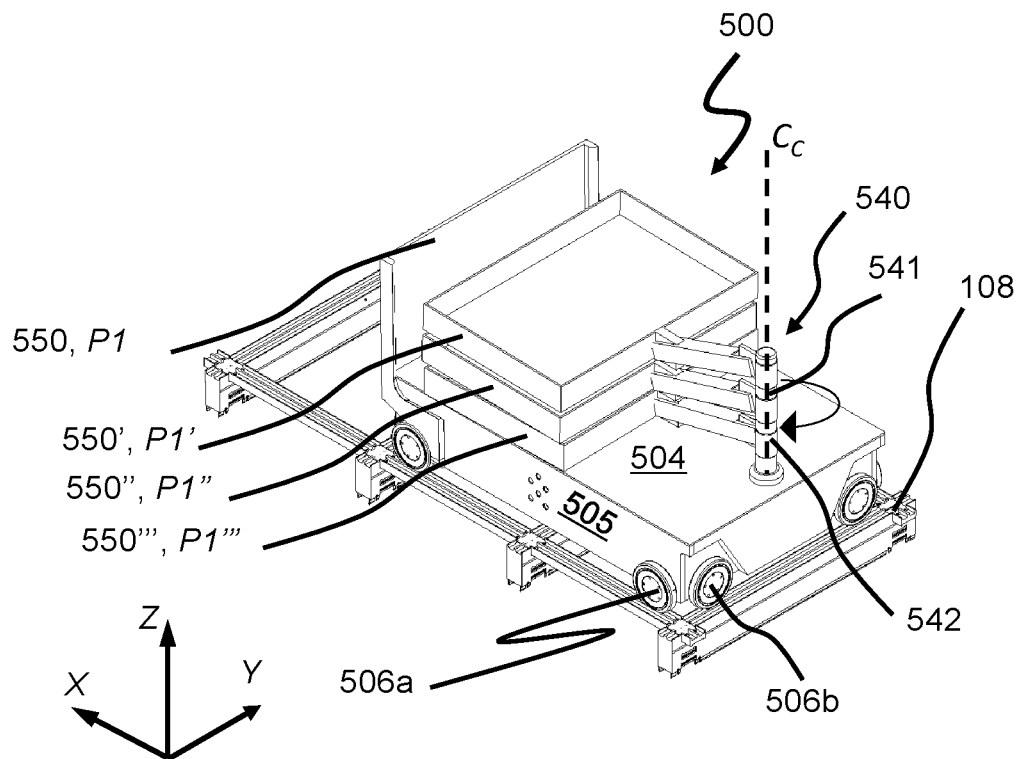
FIGS. 19A and 19B are perspective views of a remotely operated vehicle according to a thirteenth example embodiment of the invention wherein the vehicle has a rotational carousel device for supporting three containers and one pivotally mounted storage container support.
Figure 19B:
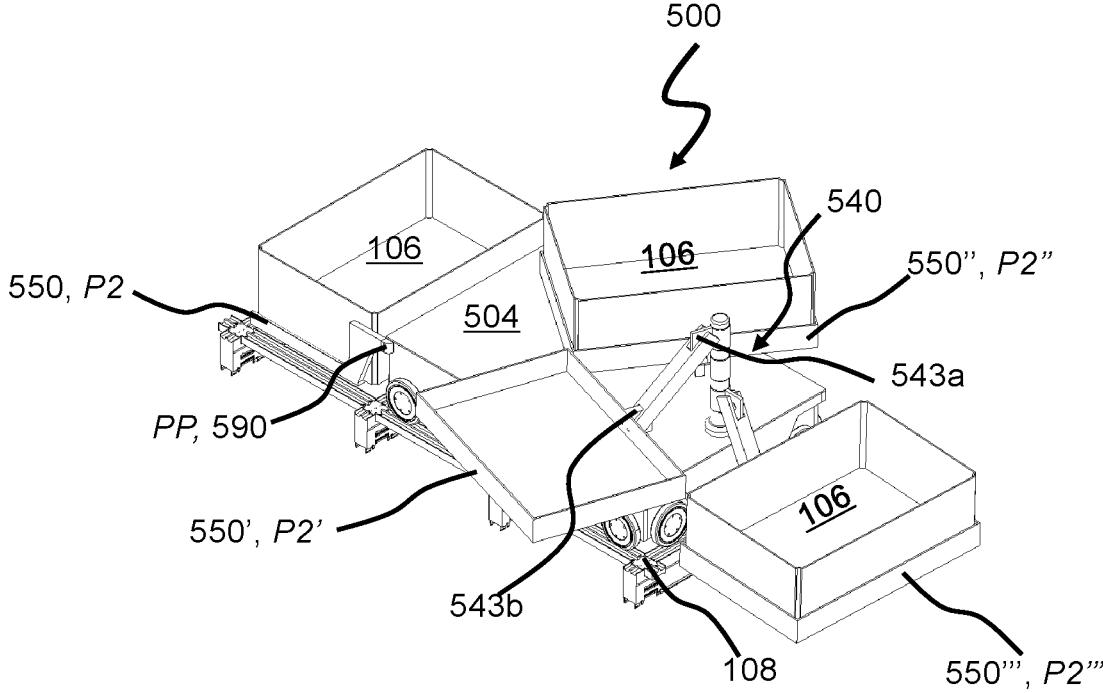

FIGS. 19A and 19B are perspective views of a remotely operated vehicle 500 according to a thirteenth example embodiment of the invention wherein the vehicle 500 has a rotational carousel device 540 and one pivotally mounted storage container support 550.

The vehicle 500 may however only comprise the rotational carousel device 540 and not the pivotally mounted storage container support 550 as they operate independently.

The rotational carousel device 540 displays a support pillar 541 being fixed to the upper surface of the vehicle body 504. The support pillar 541 extends in the third vertical direction Z and comprises three carousel arms 543 extending radially from the support pillar 541. Each carousel arm 543 is rotationally fixed to the support pillar 541 by a rotatable connection 542 at a predetermined height and has at the other distal end a storage container support 550',550",550"' fixed thereto. The storage container supports 550',550",550"' are rotatably moveable together with the carousel arms 543 around the rotational axis $C_C$ of the support pillar 541. Each arm 543 can be controlled and rotated individually. The rotational carousel device 540 may rotate the arms 543 both in a clockwise direction and a counterclockwise direction around the rotational axis $C_C$. Further, the storage container supports 550',550",550"' may always be arranged in the horizontal plane during rotation.

In FIG. 19A the first storage container support 550, second storage container support 550', third storage container support 550" and fourth storage container support 550"' are all arranged in their first positions P1,P1',P1",P1"'.

The first storage container support 550 is a pivotally mounted storage container support 550 being arranged in an upright position, i.e. being mainly arranged in the third vertical direction Z, similar to the first storage container support shown in FIG. 14A. The first storage container support is connected to the vehicle body 504 via pivot connection 590 enabling the first storage container support 550 to pivot around pivot point PP.

The second, third and fourth storage container supports 550',550",550"' are arranged on top of each other in the horizontal plane on top of the vehicle base 505. The rotational carousel device 540 with the second, third and fourth storage container supports 550',550",550"' has a footprint smaller than the footprint of the vehicle base unit 505. Hence, the footprint of the vehicle 500 corresponds to the footprint of the vehicle base unit 505 when all the storage container supports 550, 550',550",550"' are arranged in their first positions P1,P1',P1",P1"' and is equal to two grid cells of rail system 108.

For carrying a plurality of storage containers 106, the storage container supports 550, 550',550",550"' can be moved into their second positions P2, P2',P2",P2"' as shown in FIG. 19B.

The first storage container support 550 has been moved from the mainly vertical first position P1 to a mainly horizontal position P2, and a storage container 106 is arranged on the storage container support 550 when in P2.

Each of the second, third and fourth storage container supports 550',550",550"' has been rotated into the second position P2',P2",P2"' by the carousel arms 543. Each carousel arm 543 displays two joints 543a,543b such that each of the second, third and fourth storage container support 550',550",550"' can be lowered or raised. The first joint 543a is arranged approximate the support pillar 541 and the second joint 543b is arranged approximate the storage container support 550',550",550"'.

The fourth storage container support 550"' is arranged outside the footprint of the vehicle body 504. The arm 543 has lowered the position of the fourth storage container support 550"' closer to the rail system 108 which may simplify the loading of a storage container 106 onto the fourth storage container support 550"'.

As the second, third and fourth storage container support 550',550",550"' all rotate around the support pillar 541, they may all separately be positioned in the second position P2"' of the fourth storage container support 550"' as seen in FIG. 19B for facilitating the loading or offloading of a storage container 106 and thereafter move to their own second positions P2',P2".

The rotational carousel device 540 may comprise a carousel motor (not shown) for rotating the carousel arms 543 around the vertical rotational axis $C_C$.

In the operation of the vehicle 500 of the thirteenth example embodiment, the vehicle 500 may drive to a delivery device for receiving storage containers 106 on to the storage container supports 550,550',550",550"' when arranged in their second positions P2,P2',P2",P2"' or the vehicle 500 may arrange the storage container supports 550,550',550",550"' in their loading positions P2,P2"' when a delivery device approaches the vehicle 500 for loading storage containers 106 on to the storage container supports 550,550',550",550"'. When the storage container supports 550,550',550",550"' are carrying four storage containers 106 the vehicle 500 has a bigger footprint than when not carrying storage containers 106. Hence, the operation of a vehicle 500 not carrying storage containers 106 occupies less space on the rail system than a vehicle 500 carrying storage container 106. As known to a person skilled in the art, it is advantageous for the efficiency of a storage system that the vehicle 500 operating in the system has a footprint being as small as possible.

Further, as seen in FIG. 19B the second position of the first storage container support P2 and the second position P2"' of the fourth storage container support 550"' is arranged at a horizontal level nearly abutting or abutting the rail system 108. Hence, when the storage container supports 550,550',550",550"' are arranged in one of these positions the delivery device delivering storage containers to the storage container supports 550,550',550",550"' can be a cantilever container handling vehicle as disclosed in FIG. 3. The cantilever part of the vehicle comprising a storage container at the upper level thereof can be arranged directly above one of the storage container supports 550,550',550", 550"' and then lower the storage container on to the storage container support 550',550",550"'.

The operation of the storage container supports 550,550', 550",550"' can further be especially useful in situations where the delivery device cannot be arranged adjacent the vehicle 500 as disclosed for the first example embodiment.

FIGS. 20A to 20D are perspective views of a remotely operated vehicle 500 according to a fourteenth example embodiment where the vehicle 500 has two rotationally mounted storage container supports 550,550'.

Figures 20A, 20B, 20C, 20D:
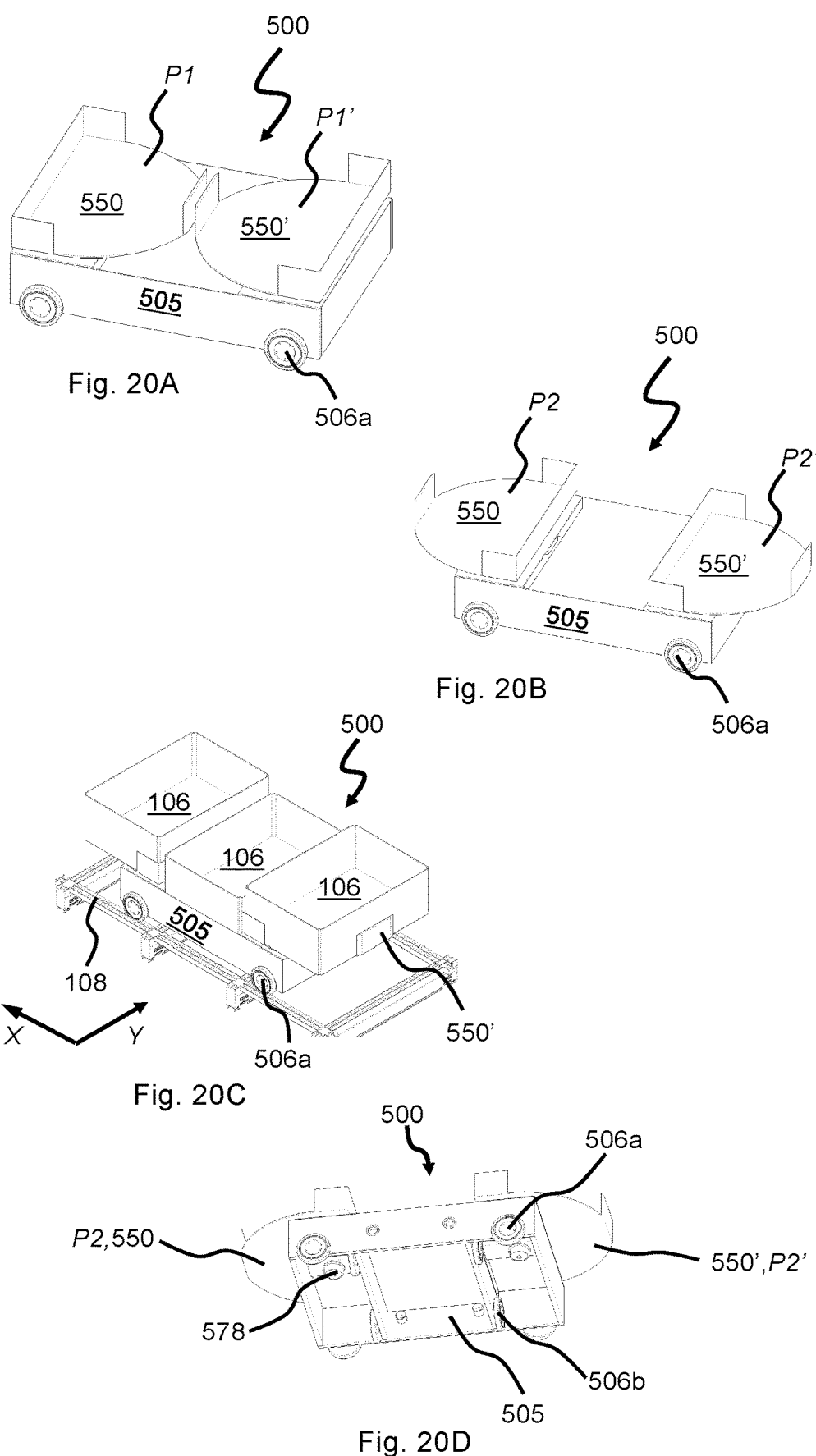
FIGS. 20A to 20D are perspective views of a remotely operated vehicle according to a fourteenth example embodiment of the invention wherein the vehicle has two rotationally mounted storage container supports.

FIG. 20A disclose the first storage container support 550 and the second storage container support 550' are arranged in their first positions P1,P1' and the footprint of the vehicle is equal to the footprint of the wheeled base unit 505.

In FIG. 20B the first storage container support 550 and the second storage container support 550' are arranged in their second positions P2,P2', hence they have both been rotated 1800 in the horizontal plane and the footprint of the vehicle 500 is larger than the footprint of the wheeled base unit 505.

In FIG. 20C shows that the vehicle 500 can carry three storage containers when the storage container supports 500, 550' are both arranged in the second positions P2,P2'. Further, FIG. 20C shows the vehicle arranged on a rail system 108. The wheeled base unit 505 has a footprint equal to two grid cells of the rail system, while the vehicle has a footprint equal to three grid cells of the rail system 108 when both of the storage container supports 550,550' are arranged in the second positions P2,P2'.

The storage container supports 550,550' extend in the first direction X in opposite directions, and each shelve 550,550'.

FIG. 20D is a perspective view of the vehicle 500 seen from below, hence being a view from below the rail system towards the wheeled base unit 505. As shown, both the storage container supports 550,550' are connected to a motor 578 providing the rotational movement of the storage container supports 550,550'.

The operation of the fourteenth example embodiment of the vehicle 500 may involve driving the vehicle to a delivery device for receiving storage containers 106 on to the storage container supports 550,550' when arranged in their second positions P2,P2', or that the vehicle 500 arranges the storage container supports 550,550' in their second position P2,P2' when a delivery device approaches the vehicle 500 for loading storage containers 106 on to the storage container supports 550,550'. Due to the rotatably mounted storage container support 550,550' more than one storage container 106 can be carried by the vehicle 500, i.e. one on each storage container support 550,550' and one on top of the wheeled base unit 505 of the vehicle 500. The vehicle 500 has a bigger footprint when carrying three storage containers 106 than when not carrying the three storage containers 106. Hence, the operation of the vehicle 500 not carrying storage containers 106 occupies less space on the rail system than the vehicle 500 carrying three storage containers 106. As known to a person skilled in the art, it is advantageous for the efficiency of a storage system that the vehicle 500 operating in the system has a footprint being as small as possible.

Further, the rotatably mounted storage container supports 550,550' can further be especially useful in situations where the delivery device cannot be arranged adjacent the vehicle 500 as also disclosed for the first example embodiment.

Figure 21A:
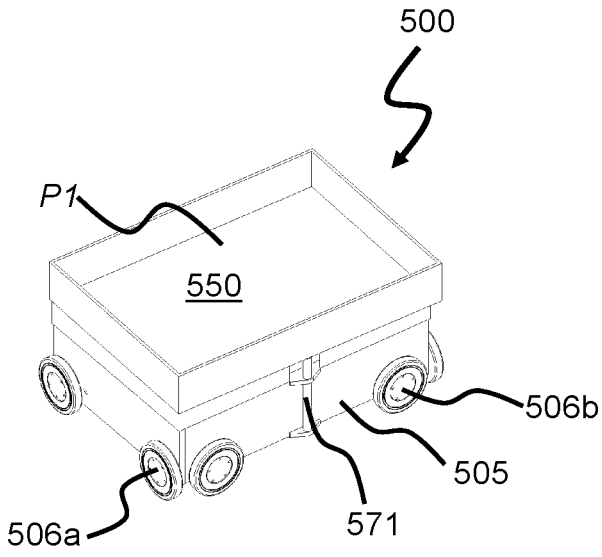
FIGS. 21A and 21B are perspective views of a remotely operated vehicle according to a fifteenth example embodiment of the invention wherein the vehicle has one rotationally mounted storage container support.
Figure 21B:
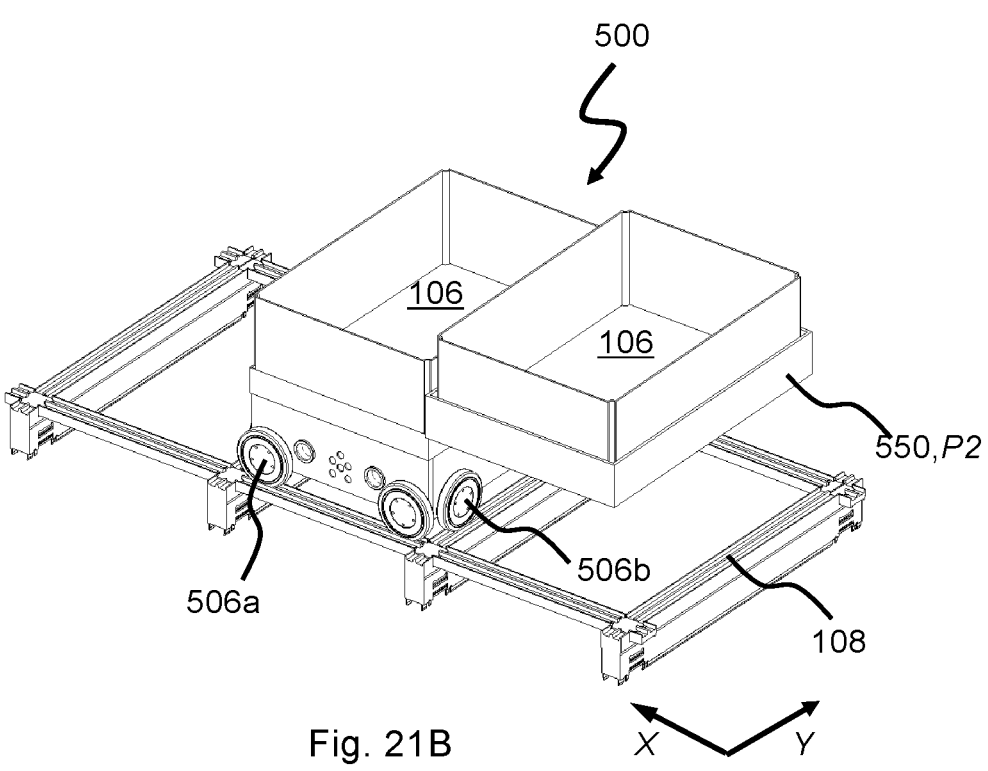

FIGS. 21A to 21B are perspective views of a remotely operated vehicle 500 according to a fifteenth example embodiment of the invention.

The vehicle 500 has one rotationally mounted storage container support 550 connected to the vehicle body 504 by a rotational shaft 571. The rotational shaft 571 is arranged at the side of the vehicle body 504 such that the shaft 571 is arranged between the vehicle body 504 and the storage container support 550 when the storage container support 550 is arranged in the second position P2 as shown in FIG. 21B.

The rotational shaft is further connected to a motor (not shown) for turning the shaft 571. When the storage container support 550 is in the second position P2, the vehicle can carry two storage containers 106 as shown in FIG. 21B.

When the storage container support is in the first position P1, the footprint of the vehicle 500 is equal to the footprint of the wheeled base unit 505 including the shaft 571. As can be seen in FIG. 21B, that footprint is equal to one grid cell of the rail system 108.

The operation of the fifteenth example embodiment of the vehicle 500 may involve driving the vehicle 500 to a delivery device for receiving storage containers 106 on to the storage container supports 550,550' when arranged in their second positions P2,P2', or that the vehicle 500 arranges the storage container supports 550,550' in their second position P2,P2' when a delivery device approaches the vehicle 500 for loading storage containers 106 on to the storage container supports 550,550'. Due to the rotatably mounted storage container support 550, more than one storage container 106 can be carried by the vehicle 500, i.e. one 550 and one on top of the wheeled base unit 505 of the vehicle 500.

The vehicle 500 has a bigger footprint when carrying two storage containers 106 than when not carrying storage containers 106. Hence, the operation of the vehicle 500 when not carrying storage containers 106 occupies less space on the rail system than the vehicle 500 carrying two storage containers 106. As known to a person skilled in the art, it is advantageous for the efficiency of a storage system that the vehicle 500 operating in the system has a footprint being as small as possible.

Further, the rotatably mounted storage container support 550 can further be especially useful in situations where the delivery device cannot be arranged adjacent the vehicle 500 as also disclosed for the first example embodiment.

FIGS. 22A to 22G are perspective views of a remotely operated vehicle according to a sixteenth example embodiment of the invention wherein the vehicle 500 has two rotationally mounted storage container supports 550,550' which are arranged on top of each other directly above the wheeled base unit 505 of the vehicle 500 when arranged in their first positions P1,P1'.

Figure 22A:
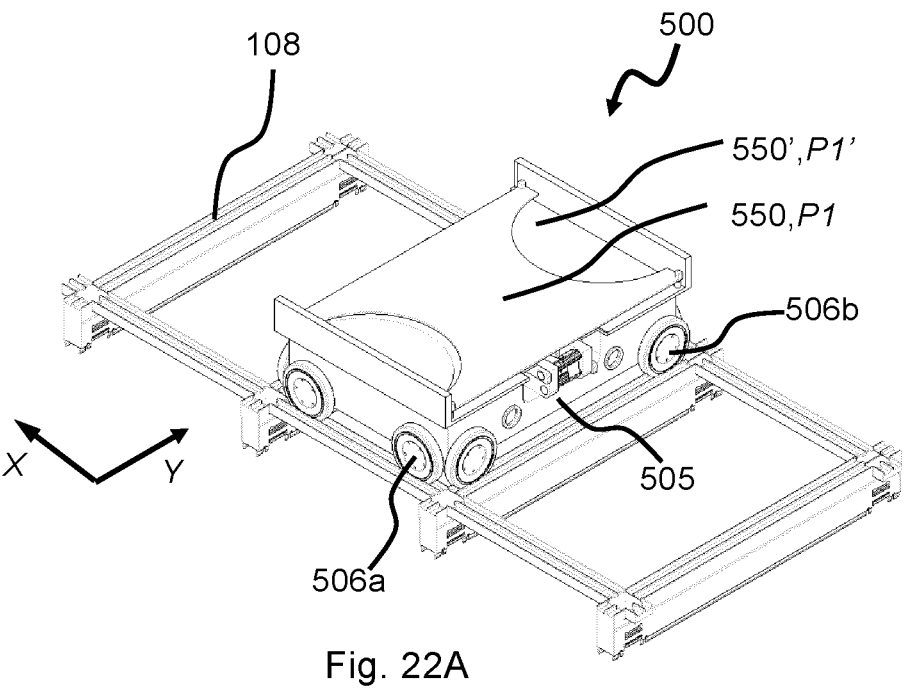
FIGS. 22A to 22G show a remotely operated vehicle according to a sixteenth example embodiment of the invention wherein the vehicle has two rotationally mounted storage container supports.

FIG. 22A shows both storage container supports 550,550' arranged in the first position P1,P1' and the vehicle 500 has a minimum footprint corresponding to the footprint of the wheeled base unit 505 which again corresponds substantially to the size of one grid cell of the rail system 108.

Figure 22B:
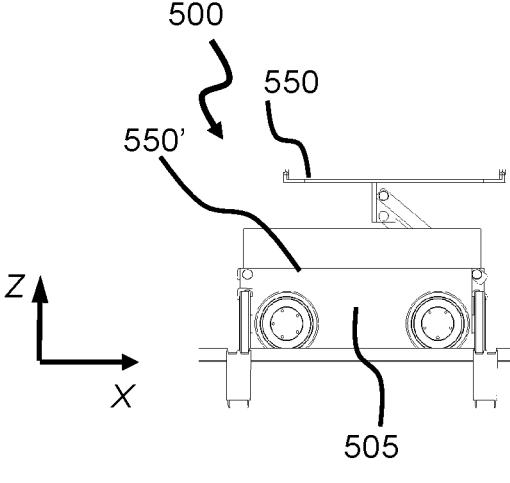

FIG. 22B shows the first storage container support 550 in an intermediate position between the first and second positions, wherein the footprint of the vehicle 500 has slightly increased. The first storage container support 550 has been moved in the horizontal first direction X and in the upwards vertical direction Z such that the first storage container support extends slightly beyond the footprint of the wheeled base unit 505.

Figure 22C:
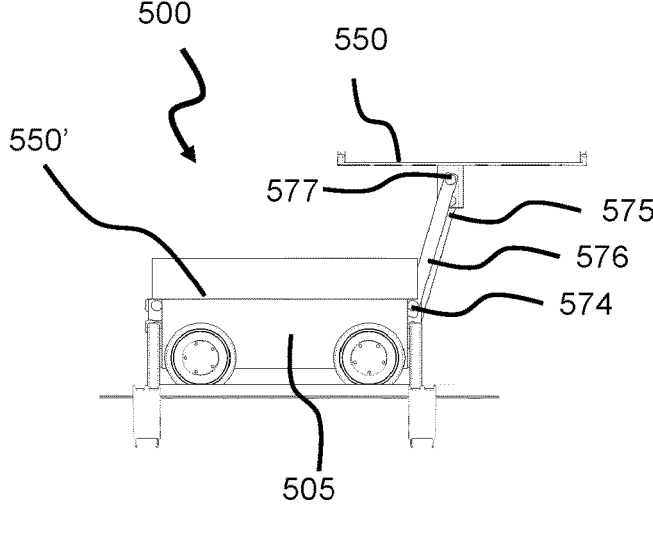

FIG. 22C shows the first storage container support 550 in another intermediate position between the first and second positions, wherein the footprint of the vehicle 500 has increased further from the position shown in FIG. 22B. Hence, the first storage container support 550 has been moved further in the vertical direction Z and first horizontal direction X such that the storage container support 550 has been moved further beyond the footprint of the wheeled base unit 505.

Figure 22D:
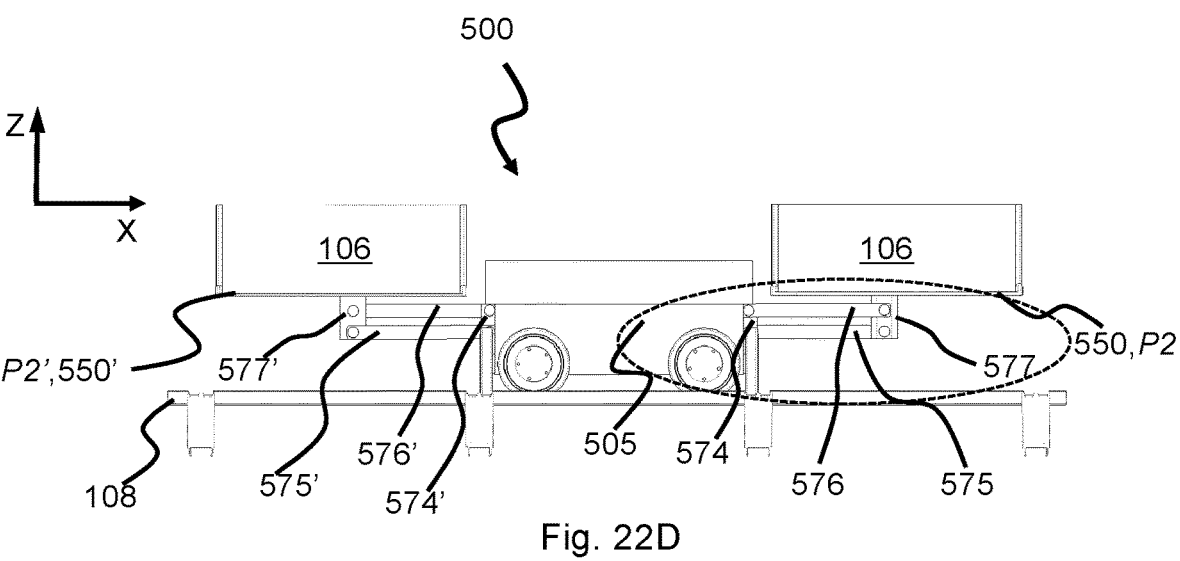

In FIG. 22D both the storage container supports 550,550' are shown in their second position P2,P2' and the vehicle has a maximum footprint being larger than the footprints shown in FIGS. 22A, 22B and 22C. The maximum footprint is equal to three grid cells of the rail system 108. Both storage container supports 550,550' carry a storage bin 106 and are arranged nearly level with their first positions shown in FIG. 22A both extending beyond the footprint of the wheeled base unit 505 in the first horizontal direction. The first and second storage container supports 550,550' extending in opposite directions from the wheeled base unit 505.

In this second position P2,P2' of the storage container supports 550,550', the storage container supports 550,550 may receive a storage container 106 on to the storage container supports. As the maximum footprint of the vehicle is the size of three grid cells, there is also space for a storage container on top of the wheeled base unit 505 as shown in FIG. 22G.

Since both storage container supports 550,550' operate in the same manner, only the operation of the first storage container support 550 will be explained in detail.

Figures 22E, 22F, 22G:
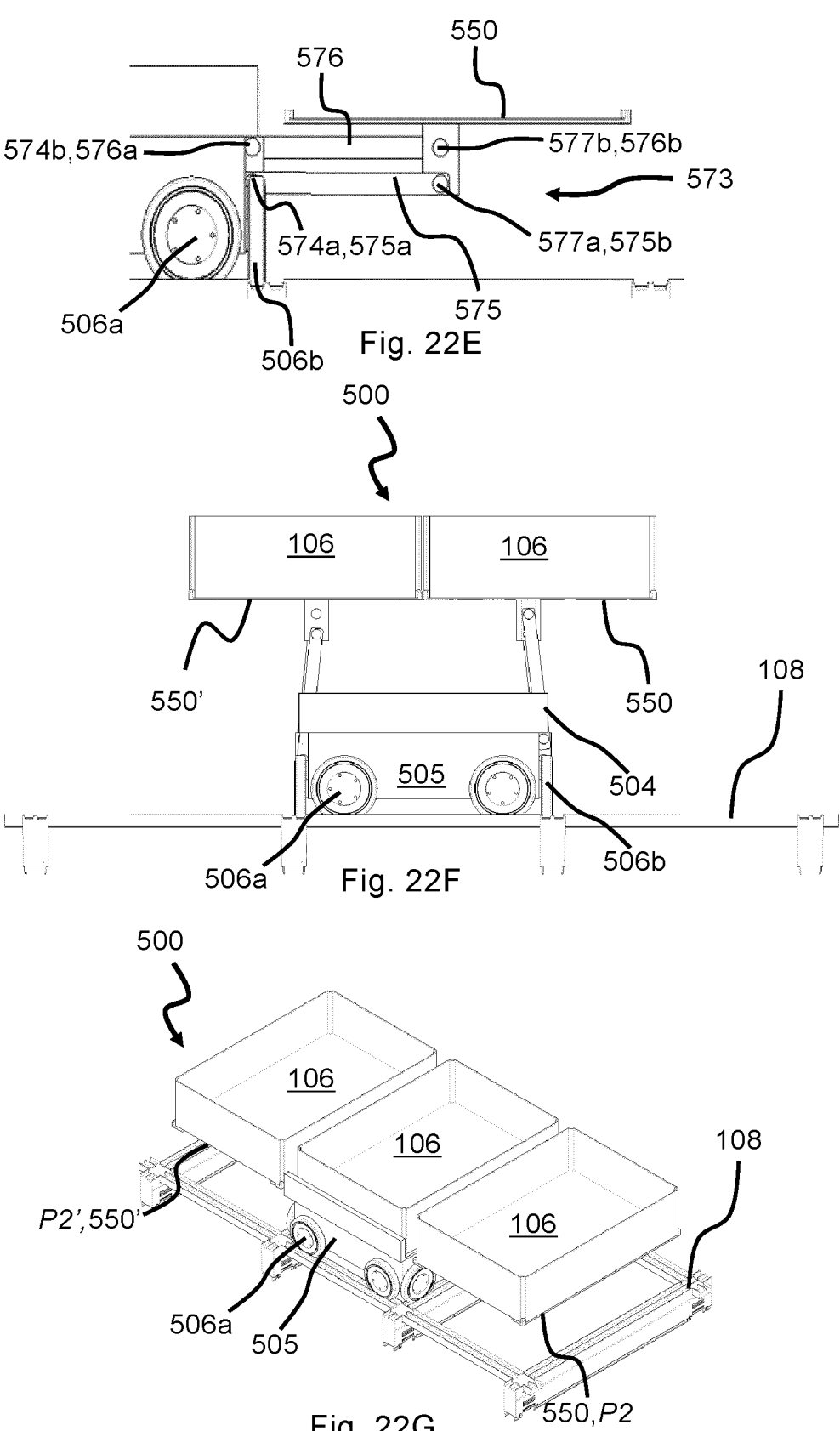

Looking at FIGS. 22D and 22E the first storage container support 550 is fixed to the wheeled base unit 505 by a connection 573 comprising a first joint bracket 574 attached to a first and a second shaft 575,576. A lower portion 574a of the first joint bracket 574 is fixed to a first end 575a of the first shaft 575, and a lower portion 577a of the second joint bracket 577 is fixed to the second end 575b of the first shaft 575. Further, an upper portion 574b of the first joint bracket 574 is fixed to a first end 576a of the second shaft 576, and an upper portion 577b of the second joint bracket 577 is fixed to the second end 576b of the second shaft 576. The first and second joint brackets 574,577 are rotationally mounted to the first and second shafts 575,576 by screws or bolts.

Hence, during movement of the first storage container support 550 from the first position P1 as shown in FIG. 22A to the second position P2 shown in FIG. 22D, the storage container support 550 is always kept in the horizontal plane due to the connection 573 comprising the two shafts 576,575 connected to the same joint brackets 574,577 at different heights.

As discussed above with regard to the pivotally mounted storage container supports, the movement of the connection 573 can be activated by an electric actuator.

FIG. 22F is a side view of the vehicle 500 where each storage container support 500,550' carries a storage container arranged at their highest positions. The footprint of the vehicle 500 corresponds to two grid cells and is the smallest footprint possible for the vehicle carrying two storage containers 106.

Figure 23:
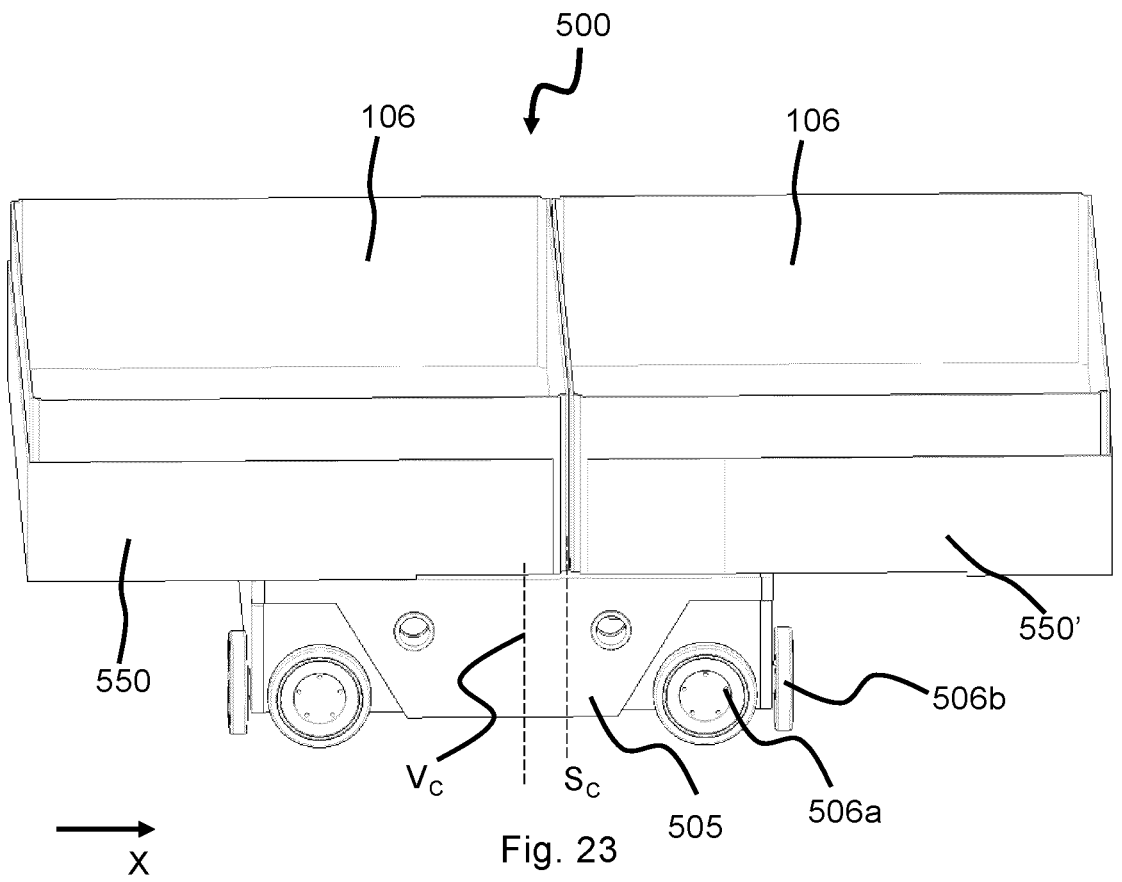
FIG. 23 is a perspective view of a remotely operated vehicle according to the second or sixth example embodiments of the invention shown in FIG. 7B having a weight distribution system with a load moving device for changing a center of gravity of the vehicle dependent on the load of one or both storage containers carried by the vehicle.

FIG. 23 is perspective views of a remotely operated vehicle 500 according to the second and sixth example embodiments of the invention shown in FIGS. 7B, having a weight distribution system with a load moving device (not shown) for changing a center of gravity of the vehicle 500 dependent on the load of one or both storage containers carried 106 by the vehicle 500.

The movable load is the storage container supports 550, 550' arranged above the wheeled base unit 505.

The center of the vehicle $V_C$ is shown not to overlap with the center of the storage container supports $S_C$ as disclosed in FIG. 7B. Hence the storage container supports have been moved along an extent in the first direction X, here equal to about 15% of the length of vehicle body 505 along the first direction X.

Hence, the vehicle's center of mass has changes and the vehicle 500 is kept steady.

Generally, according to any one of the example embodiments mentioned above, the vehicle 500 has, when the storage container support/storage container supports 550 are arranged in the second position(s) a larger capacity for carrying storage containers 106 and/or better access for loading/offloading a storage container 106 onto or from the vehicle 500 by the delivery device.

Further, according to all the example embodiments, the vehicle 500 may further comprise sensors that detect the presence of a storage container 106 on a storage container support 550,550',550",550"'. Hence, if no storage container 106 is present, the vehicle 500 can automatically arrange the storage container support 550,550',550",550"' in the first positions P1,P1',P1",P1"' assuring that the footprint of the vehicle 500 is as small as possible.

Further, the vehicle 500 of all the above-mentioned embodiments may comprise sensors sensing the footprint of the vehicle 500 in situ for calculating the fastest route on the rail system 108 from one position to the other taking the footprint into account.

All the embodiments mentioned above may operate as follows:

A delivery device can approach the inventive remotely operated vehicle 500, or alternatively the inventive remotely operated vehicle 500 can approach the delivery device.

Either way, if the vehicle 500 is empty, i.e. not carrying any storage containers 106 on the storage container support 550, the storage container support 550 will be arranged in the first position P1. In order to load a storage container 106 onto the storage container support, the vehicle 500 moves the empty storage container support 550 into a loading/offloading second position P2. The delivery device can then place the storage container 106 on the empty storage container support 550. After loading, the vehicle 500 can move to another location of the rail system 108 for offloading of the storage container 106.

If the vehicle 500 comprises a plurality of storage container supports 550,550',550",550"', each of the storage container supports 550,550',550",550"' can simultaneously or individually/separately be arranged in their second positions for loading the storage container supports 550,550', 550",550"' with storage containers 106.

In the preceding description, various aspects of the container handling vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. For example, although the term wheeled base unit with first and second sets of wheels has been used as example throughout the description, a belt base with first and second belts for guiding along the rail system may be used instead. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Prior art automated storage and retrieval system
100 Framework structure
102 Upright/vertical members of framework structure
103 Horizontal members of framework structure
104 Storage grid
105 Storage column
106 Storage container
106' Particular position of storage container
107 Stack
108 Rail system/rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
115 Access opening/grid opening
119 First port column 120 Second port column
122 Grid cell/single cell
201 Prior art container handling vehicle
201a Vehicle body of the container handling vehicle 201
201b Drive means/wheel arrangement, first direction (X)
201c Drive means/wheel arrangement, second direction (Y)
301 Prior art cantilever container handling vehicle
301a Vehicle body of the container handling vehicle 301
301b Drive means in first direction (X)
301c Drive means in second direction (Y)
304 Gripping device
500 Remotely operated vehicle
503 Rechargeable battery
504 Vehicle body
505 Base/wheeled base unit
506a First set of driving means
506b Second set of driving means
507 Displacement assembly
508 Motor
509,509' Electric motor
510 Lifting device
511 Vertically extending structure
512 Top cover
515 Top panel/flange
516 Center opening
517 Through holes
518 Electronic controlling unit
520 Stabilizing structure
530 Cantilever
532 Lifting device
540 Rotational carousel device
541 Support pillar
542 Rotatable connection
543 Carousel arm
543a First joint
543b Second joint
544 Hinged connections
550 Storage container support/first storage container support
550' Second storage container support
550" Third storage container support
550''' Fourth storage container support
552a,552b Protrusion of the first storage container support
552a',552b' Protrusion of the second storage container support
553a,553b Recess of the first storage container support
553a',553b' Recess of the second storage container support
554 Gap/opening
555a First half of first storage container support
555a' Second half of first storage container support
555b First half of second storage container support
555b' Second half of second storage container support
560 Central cavity
571 Rotatable shaft
573 Connection
574 First joint bracket
574a Lower portion of first joint bracket
574b Upper portion of first joint bracket
575 First shaft
575a First end of first shaft
575b Second end of first shaft
576 Second shaft
576a First end of second shaft
576b Second end of second shaft 577 Second joint bracket
577a Lower portion of second joint bracket
577b Upper portion of second joint bracket
578 Motor
580 Moving mechanism/ball screw mechanism
582 First longitudinal shaft
582' Second longitudinal shaft
582a First threaded section of first longitudinal shaft
582a' First threaded section of second longitudinal shaft
582b Second unthreaded section of first longitudinal shaft
582b' Second unthreaded section of second longitudinal shaft
582c Third section of first longitudinal shaft
582c' Third section of second longitudinal shaft
583 First bracket
583' Second bracket
584 First longitudinal bar
584' Second longitudinal bar
585 First belt
585' Second belt
587 Central longitudinal bar/pinion
587a First end section of central longitudinal bar
587b Second end section of central longitudinal bar
588 Motor
590 Pivot connection/first pivot connection
590' Second pivot connection
590" Third pivot connection
590''' Fourth pivot connection
591 Rotatable shaft
592a Longitudinally extending arm
592b Longitudinally extending arm
593 Tilting mechanism
900 Control system
A First footprint/minimum footprint
B Second footprint/maximum footprint
$C_C$ Vertical rotational axis
D Pivoting direction of storage container support/first storage container support
D' Pivoting direction of second storage container support
$L_S$ Total length of storage container support
P1 First position of the storage container support/First position of the first storage container support
P1' First position of second storage container support
P1" First position of third storage container support
P''' First position of fourth storage container support
P2 Second position of the storage container support/Second position of the first storage container support
P2' Second position of second storage container support
P2" Second position of third storage container support
P2''' Second position of fourth storage container support
PH Horizontal plane
PP Pivot point/first pivot point
PP' Second pivot point
$V_C$ Center of vehicle
$S_C$ Center of storage container supports
X First horizontal direction
Y Second horizontal direction
Z Third vertical direction

The invention claimed is:

1. A remotely operated vehicle for transporting a storage container on a rail system of an automated storage and retrieval system, the vehicle comprising:

a first set of driving means for moving the vehicle along a first direction on the rail system;

a second set of driving means for moving the vehicle along a second direction on the rail system, the second direction being perpendicular to the first direction; and

a storage container support for carrying the storage container, wherein the storage container support is movable between:

a first position with a first footprint; and a second position with a second footprint, wherein the second footprint is larger than the first footprint in at least one of the first and/or second directions, wherein the storage container support is configured to support the storage container from below, and wherein the vehicle is configured to carry more storage containers when the storage container support is arranged in the second position than when the storage container support arranged in the first position.

2. The remotely operated vehicle according to claim 1, wherein the storage container support is pivotally mounted to the remotely operated vehicle at a pivot point and movable in a pivoting motion about the pivot point between the first and second positions, such that the storage container support comprises a component in a third direction when arranged in the first position.

3. The remotely operated vehicle according to claim 1, wherein the storage container support is slidably mounted to the remotely operated vehicle, such that the storage container support is slidable in one of the first or second directions between the first and second positions.

4. The remotely operated vehicle according to claim 1, wherein the storage container support is telescopically mounted to the remotely operated vehicle, such that the storage container support is telescopically extending in one of the first or second directions between the first and second positions.

5. The remotely operated vehicle according to claim 1, wherein the storage container support is rotationally mounted to the remotely operated vehicle, such that the storage container support is rotating in a horizontal plane between the first and second positions.

6. The remotely operated vehicle according to claim 1, further comprising a vehicle body comprising a base, wherein the base is a wheeled base unit, and wherein the first set of driving means is a first set of wheels, and the second set of driving means is a second set of wheels.

7. The remotely operated vehicle according to claim 6, wherein an electrically operated actuator is arranged within the vehicle body for facilitating a movement of the storage container support.

8. The remotely operated vehicle according to claim 6, wherein the storage container support extends in the first direction and wherein a width of the storage container support in the second direction is equal to or within the footprint of the base.

9. The remotely operated vehicle according to claim 6, wherein the base of the vehicle body comprises a stabilizing structure extending directly below the storage container support when the storage container support is arranged in the second position.

10. The remotely operated vehicle according to claim 9, wherein the storage container support extends in the first direction, and wherein the stabilizing structure extends from 20 to 90% of a total length of the storage container support in the first direction.

11. The remotely operated vehicle according to claim 6, wherein the first footprint is equal to a vertical projection of the vehicle body.

12. The remotely operated vehicle according to claim 1, wherein the storage container support is up to 20% larger than a base area of the storage container.

13. The remotely operated vehicle according to claim 1,

further comprising a rotational carousel device having a vertical rotational axis and wherein the storage container support is connected to the rotational carousel device allowing rotation of the storage container support from the first position to the second position.

14. The remotely operated vehicle according to claim 13, further comprising a carousel arm extending radially from a central portion of the rotational carousel device, a carousel motor configured to rotate the carousel arm around the vertical rotational axis and wherein the storage container support is arranged at an end of the carousel arm distal to the vertical rotational axis.

15. The remotely operated vehicle according to claim 13, wherein a plurality of storage container supports are connected to the rotational carousel device.

16. A method for operating a remotely operated vehicle according to claim 1, wherein the method comprises:

moving the remotely operated vehicle towards a first location for receiving a storage container while the storage container support is in the first position, arranging the remotely operated vehicle at said first location and moving the storage container support into the second position for receiving and storing the storage container.

17. The method according to claim 16, wherein the method further comprises:

moving the remotely operated vehicle to a second location for delivering the storage container to a receiving unit while the storage container support is arranged in the second position.

18. The method according to claim 16, wherein the method steps are monitored and controlled by a control system receiving and sending wireless data communication to said remotely operated vehicle.

19. An automated storage and retrieval system comprising:

a rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane comprising a plurality of adjacent grid cells, each grid cell comprising a grid opening, a portion of a pair of neighboring rails of the first set of rails and a portions of a pair of neighboring rails of the second set of rails said portions delimiting the grid opening;

a plurality of stacks of storage containers arranged in storage columns located beneath the rail system, wherein each storage column is located vertically below a grid opening;

a remotely operated vehicle for supporting at least one storage container, the vehicle being configured to move on the rail system above the storage columns, the vehicle comprising:

a first set of driving means for moving the vehicle along a first direction on the rail system, and a second set of driving means for moving the vehicle along a second direction on the rail system, the second direction being perpendicular to the first direction; and a storage container support for carrying the storage container, wherein the storage container support is movable between:

a first position with a first footprint; and a second position with a second footprint, wherein the second footprint is larger than the first footprint in at least one of the first and/or second directions, wherein the storage container support is configured to support the storage container from below, and wherein the vehicle is configured to carry more storage containers when the storage container support is arranged in the second position than when the storage container support arranged in the first position.

20. The system according to claim 19, further comprising a delivery device for delivering storage containers to the storage container support.

21. The system according to claim 19, wherein the vehicle further comprises a vehicle body comprising a base, wherein the vehicle body of the vehicle further comprises a vertically extending structure extending from the base, the vertically extending structure comprising a cantilever at an upper end having a lifting device for raising and lowering a storage container to and from a position below the cantilever, wherein the cantilever extends in the first direction in an opposite direction to the storage container support when arranged in the second position and the cantilever being arranged at an opposite side of the vehicle compared to a position of the storage container support.

22. The system according to claim 21, wherein the vehicle body further comprises a central cavity within the vehicle body comprising a lifting device for raising and lowering a storage container to and from a position within the cavity.

23. The system according to claim 19, wherein the system further comprises a control system receiving information with regard to the footprint of the remotely operated vehicle for use in controlling the vehicle on the rail system of the automated storage and retrieval system.

24. The system according to claim 19, wherein a size of the first footprint of the remotely operated vehicle is equal to the size of the grid cell.

25. The system according to claim 19, wherein a ratio between a size of the grid cell and a size of the first footprint of the remotely operated vehicle is from 1:1 to 1:2.

\* \* \* \* \*